US008797568B2

(12) United States Patent
Yamanaka

(10) Patent No.: US 8,797,568 B2
(45) Date of Patent: Aug. 5, 2014

(54) IMAGE PROCESSING SYSTEM

(75) Inventor: Toshihiro Yamanaka, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 2036 days.

(21) Appl. No.: 11/150,709

(22) Filed: Jun. 9, 2005

(65) Prior Publication Data

US 2005/0275887 A1    Dec. 15, 2005

(30) Foreign Application Priority Data

Jun. 10, 2004  (JP) ................. 2004-172940
Jun. 10, 2004  (JP) ................. 2004-172941
Jun. 10, 2004  (JP) ................. 2004-172942
Jun. 10, 2004  (JP) ................. 2004-172945
Jun. 30, 2004  (JP) ................. 2004-194865

(51) Int. Cl.
*G06F 15/00*    (2006.01)
(52) U.S. Cl.
USPC ............................ 358/1.15; 358/1.14
(58) Field of Classification Search
CPC ............ H04N 2201/0094; H04N 2201/0049; H04N 2201/0041; H04N 2201/0036; H04N 1/00408; H04N 1/0049; H04N 1/44; H04N 1/00127; G06F 3/12
USPC ........... 358/1.1, 1.15, 1.9, 1.18; 709/219, 246
See application file for complete search history.

(56) References Cited

U.S. PATENT DOCUMENTS

| 6,385,728 | B1 * | 5/2002 | DeBry | 726/9 |
| 7,266,590 | B2 * | 9/2007 | Nakaoka et al. | 709/219 |
| 2004/0252337 | A1 * | 12/2004 | Takabayashi et al. | 358/1.15 |

FOREIGN PATENT DOCUMENTS

| JP | 03-184477 | 8/1991 | | |
| JP | 04-178038 | 6/1992 | | |
| JP | 05-053672 | 3/1993 | | |
| JP | 07-276744 | 10/1995 | | |
| JP | 08-149318 | 6/1996 | | |
| JP | 08-307554 | 11/1996 | | |
| JP | 08307554 | * 11/1996 | ............ | H04N 11/00 |
| JP | 09-223061 | 8/1997 | | |
| JP | 2000-099466 | 4/2000 | | |
| JP | 2001-103207 | 4/2001 | | |
| JP | 2001-236183 | 8/2001 | | |
| JP | 2002-247315 | 8/2002 | | |
| JP | 2002-261876 | 9/2002 | | |
| JP | 2003-122458 | 4/2003 | | |

(Continued)

OTHER PUBLICATIONS

JP2004023478, Kayatani Ryoji, Jan. 2004, English Translation.*

(Continued)

*Primary Examiner* — King Poon
*Assistant Examiner* — Iriana Cruz
(74) *Attorney, Agent, or Firm* — Edwards Wildman Palmer LLP; David G. Conlin; Steven M. Jensen

(57) ABSTRACT

A complex apparatus (image processing apparatus) requests the transmission of an identification number from a security box (data processing apparatus). The security box transmits the stored own identification number to the complex apparatus. When no response is received within a predetermined time after the request of transmission of the identification number, or alternatively when the identification number transmitted from the security box differs from the identification number of a security box stored in advance, the complex apparatus displays a warning screen indicating that the appropriate security box has been removed, on the displaying section of the operation panel, and then turns ON a notifying lamp.

5 Claims, 26 Drawing Sheets

(56) References Cited

FOREIGN PATENT DOCUMENTS

| | | | | |
|---|---|---|---|---|
| JP | 2003-186819 | 7/2003 | | |
| JP | 2003-244392 A | 8/2003 | | |
| JP | 2003-330687 | 11/2003 | | |
| JP | 2003-330890 | 11/2003 | | |
| JP | 2004023478 | * 1/2004 | ............... | H04N 1/00 |
| JP | 2004-070828 | 3/2004 | | |
| JP | 2004-109765 | 4/2004 | | |
| JP | 2004-118232 A | 4/2004 | | |
| JP | 2004-130561 | 4/2004 | | |

OTHER PUBLICATIONS

JP08307554, Suga Takeshi, Nov. 1996, English Translation.*
English translation of JP08307554.*
English translation of JP2004023478.*

* cited by examiner

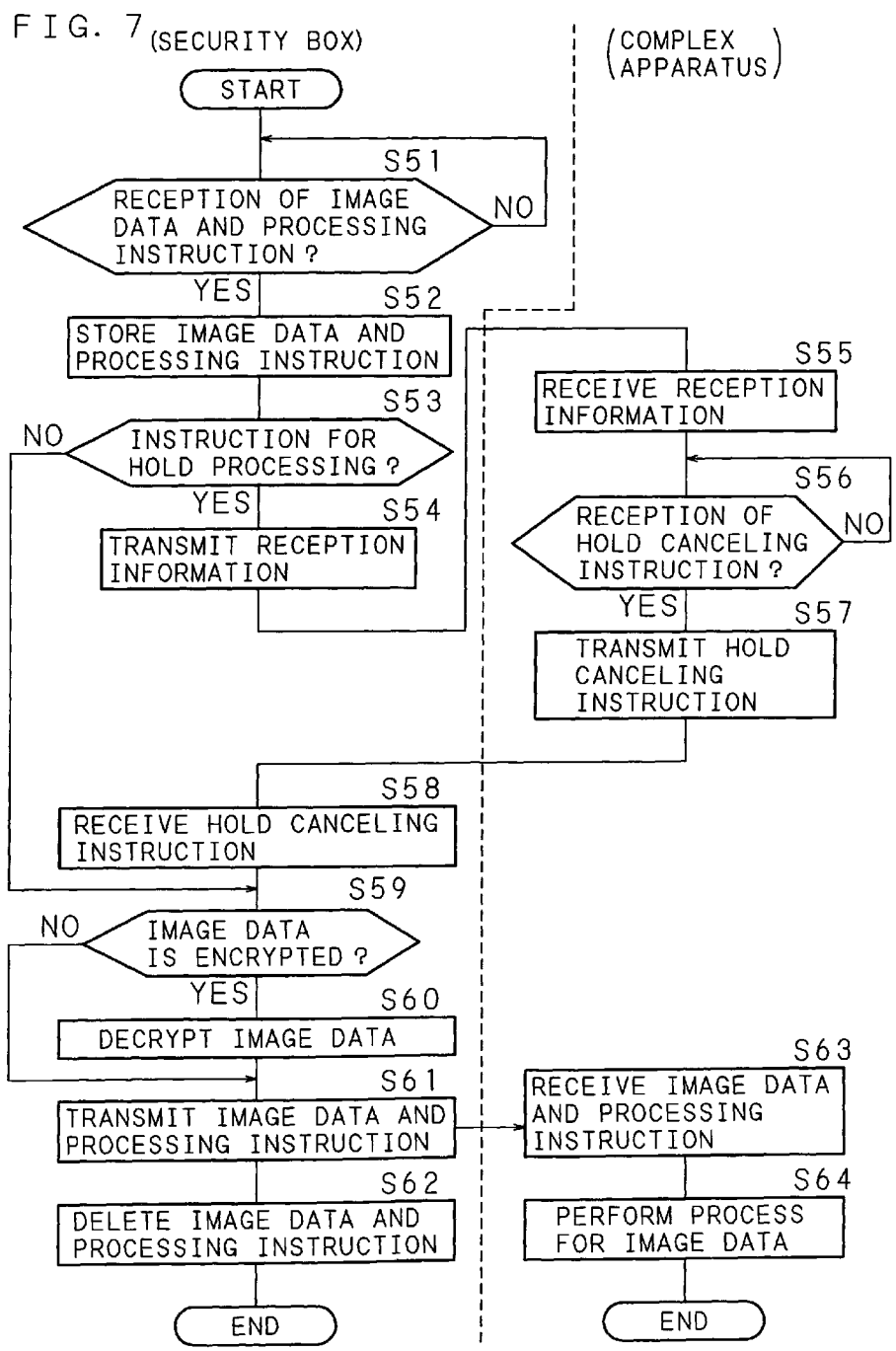

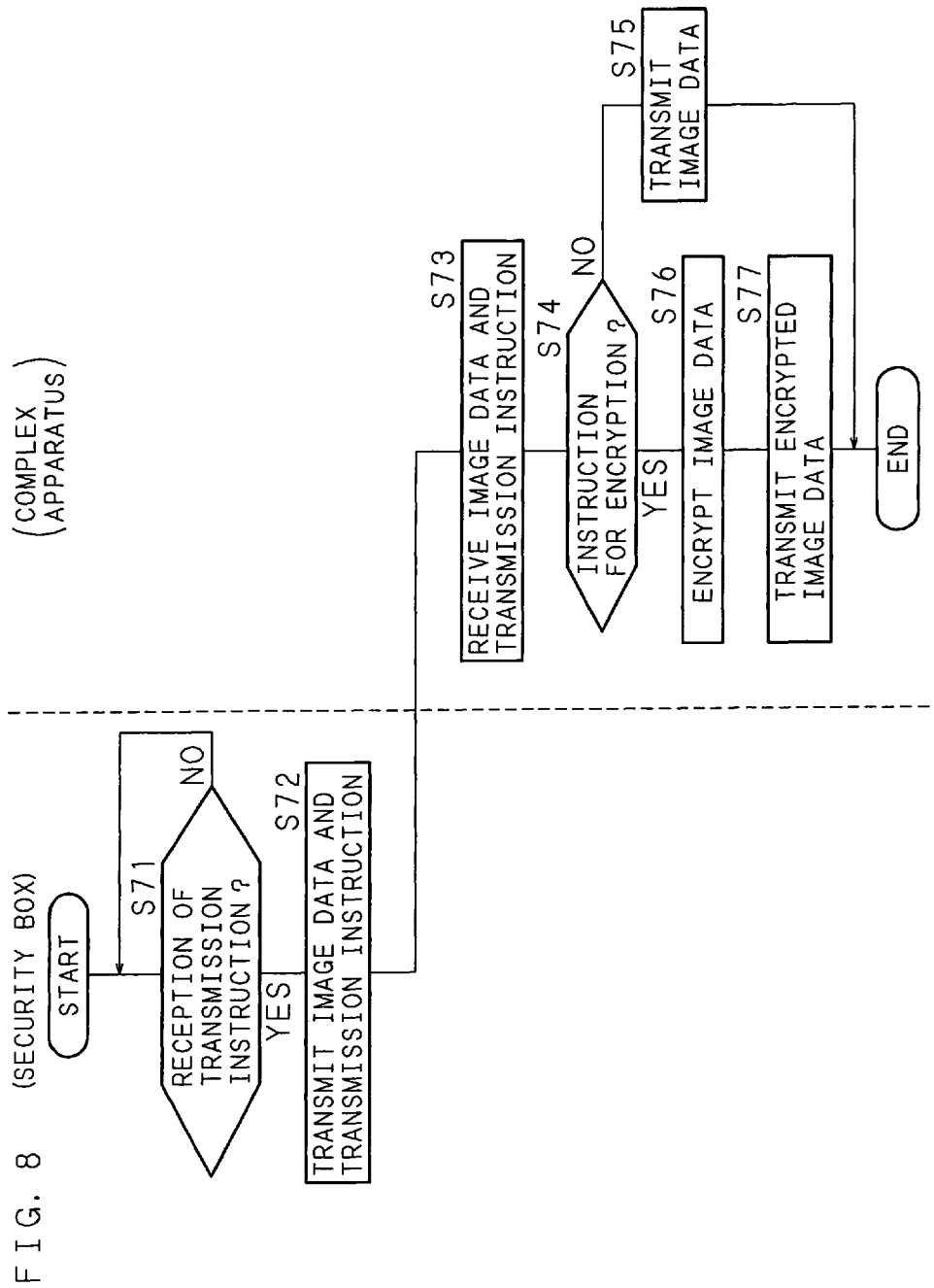

FIG. 9

| OWN IDENTIFICATION NUMBER | SB-ΔΔΔΔ |
|---|---|
| IDENTIFICATION NUMBER OF DESTINATION | AR-xxxx |
| PASSWORD FOR ADMINISTRATOR | 1234 |
| E-MAIL ADDRESS | ○○@ΔΔ.ne.jp |

FIG. 13

| OWN IDENTIFICATION NUMBER | AR-xxxx |
|---|---|
| IDENTIFICATION NUMBER OF DESTINATION | SB-△△△△ |
| PASSWORD FOR ADMINISTRATOR | 1234 |
| E-MAIL ADDRESS | ○○@△△.ne.jp |
| SECRETS PROCESS | ON |
| TRANSMITTING PROCESS | ON |

FIG. 15A

| JOB SITUATION | | | |
|---|---|---|---|
| USER NAME | JOB NAME | STATUS | 1/10 |
| AAA | P001 | COMPLETION | ⇧ |
| BBB | P002 | COMPLETION | |
| CCC | P003 | HOLD | ⇩ |
| | | OK | |

FIG. 15B

JOB SITUATION

⚠ OUTPUT OF DATA IS INHIBITED AT PRESENT

PLEASE ASK DETAILS OF ADMINISTRATOR

JOB SITUATION

PLEASE INPUT PIN CODE BY NUMERIC KEYPAD

****

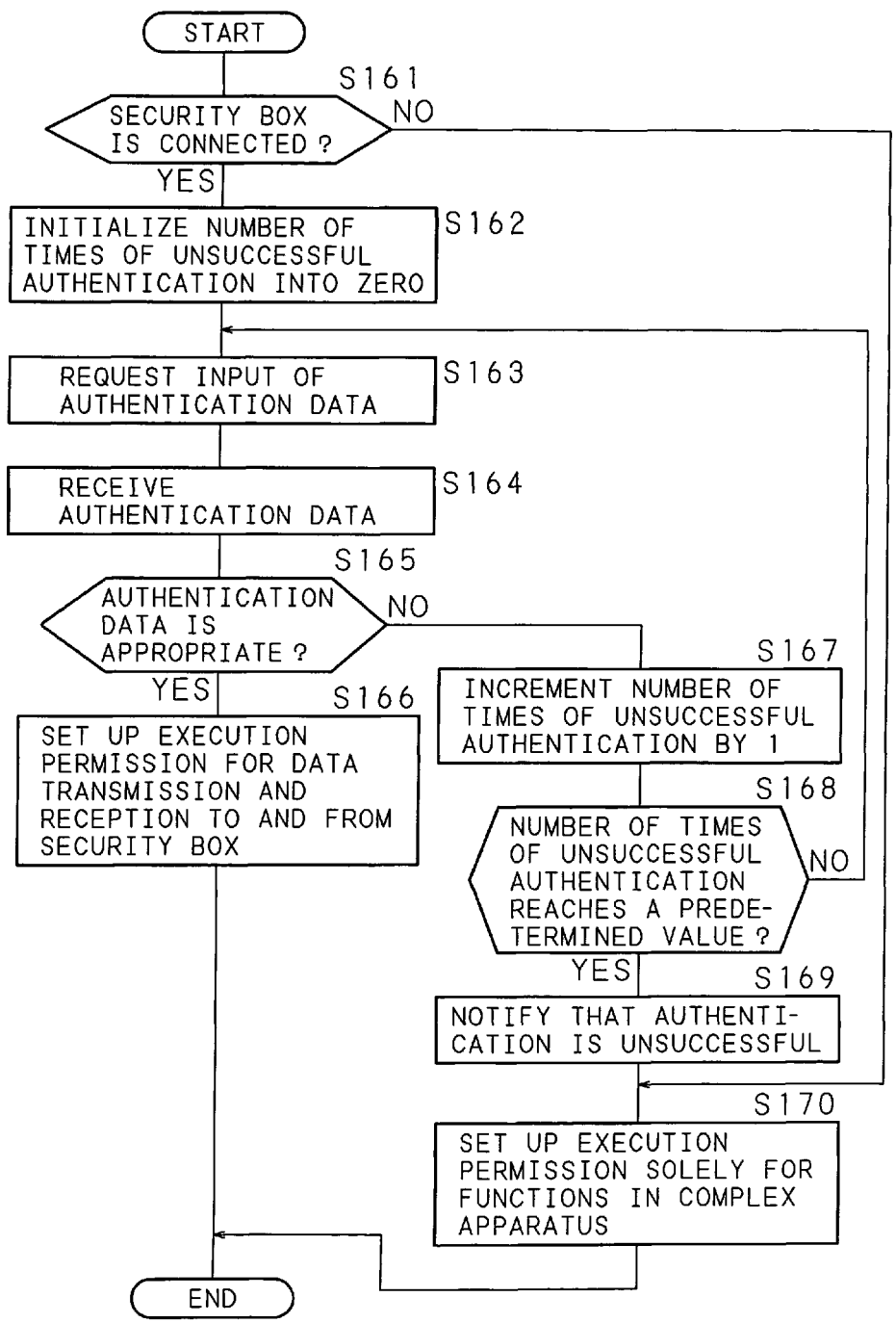

FIG. 21

FUNCTION DATABASE CONCERNING SECURITY BOX

| FUNCTION CODE | FUNCTIONAL CONTENTS | AUTHENTICATION |
|---|---|---|
| 0001 | THE FUNCTION OF DATA RECEPTION THROUGH THE COMMUNICATION NETWORK | NECESSITY |
| 0002 | THE FUNCTION OF DATA TRANSMISSION THROUGH THE COMMUNICATION NETWORK | NECESSITY |
| 0003 | THE FUNCTION OF DATA RECEPTION THROUGH THE USB CABLE | NON-NECESSITY |
| 0004 | THE FUNCTION OF DATA TRANSMISSION THROUGH THE USB CABLE | NON-NECESSITY |
| ... | ... | ... |

FIG. 23A
FUNCTION DATABASE CONCERNING SECURITY BOX

| IDENTIFI-CATION NUMBER | FUNCTION CODE | FUNCTIONAL CONTENTS | AUTHENTI-CATION |
|---|---|---|---|
| 100 | 0001 | THE FUNCTION OF DATA RECEPTION THROUGH THE COMMUNICATION NETWORK | NECESSITY |
| | 0002 | THE FUNCTION OF DATA TRANSMISSION THROUGH THE COMMUNICATION NETWORK | NECESSITY |
| | 0003 | THE FUNCTION OF DATA RECEPTION THROUGH THE USB CABLE | NON-NECESSITY |
| | 0004 | THE FUNCTION OF DATA TRANSMISSION THROUGH THE USB CABLE | NON-NECESSITY |
| | ⋮ | ⋮ | ⋮ |
| 200 | 0001 | THE FUNCTION OF DATA RECEPTION THROUGH THE COMMUNICATION NETWORK | NON-NECESSITY |
| | 0002 | THE FUNCTION OF DATA TRANSMISSION THROUGH THE COMMUNICATION NETWORK | NON-NECESSITY |
| | 0003 | THE FUNCTION OF DATA RECEPTION THROUGH THE USB CABLE | NON-NECESSITY |
| | 0004 | THE FUNCTION OF DATA TRANSMISSION THROUGH THE USB CABLE | NON-NECESSITY |
| | ⋮ | ⋮ | ⋮ |
| ⋮ | ⋮ | ⋮ | ⋮ |

FIG. 23B

| IDENTIFICA-TION NUMBER | AUTHENTICATION |
|---|---|
| 100 | NECESSITY |
| 200 | NON-NECESSITY |
| ⋮ | |

FIG. 25

FUNCTION DATABASE CONCERNING SECURITY BOX

| IDENTIFICATION NUMBER | FUNCTION CODE | FUNCTIONAL CONTENTS | AUTHENTI-CATION | STATE OF EXECUTION PERMISSION |
|---|---|---|---|---|
| 100 | 0001 | THE FUNCTION OF DATA RECEPTION THROUGH THE COMMUNICATION NETWORK | NECESSITY | NON-PERMISSION |
| | 0002 | THE FUNCTION OF DATA TRANSMISSION THROUGH THE COMMUNICATION NETWORK | NECESSITY | NON-PERMISSION |
| | 0003 | THE FUNCTION OF DATA RECEPTION THROUGH THE USB CABLE | NON-NECESSITY | PERMISSION |
| | 0004 | THE FUNCTION OF DATA TRANSMISSION THROUGH THE USB CABLE | NON-NECESSITY | PERMISSION |
| | ... | ... | ... | ... |
| 200 | 0001 | THE FUNCTION OF DATA RECEPTION THROUGH THE COMMUNICATION NETWORK | NECESSITY | NON-PERMISSION |
| | 0002 | THE FUNCTION OF DATA TRANSMISSION THROUGH THE COMMUNICATION NETWORK | NECESSITY | NON-PERMISSION |
| | 0003 | THE FUNCTION OF DATA RECEPTION THROUGH THE USB CABLE | NON-NECESSITY | PERMISSION |
| | 0004 | THE FUNCTION OF DATA TRANSMISSION THROUGH THE USB CABLE | NON-NECESSITY | PERMISSION |
| | ... | ... | ... | ... |
| ... | | | | |

IMAGE PROCESSING SYSTEM

CROSS-REFERENCE TO RELATED APPLICATIONS

This Nonprovisional application claims priority under 35 U.S.C. §119(a) on Patent Applications No. 2004-172940 filed in Japan on Jun. 10, 2004, No. 2004-172941 filed in Japan on Jun. 10, 2004, No. 2004-172942 filed in Japan on Jun. 10, 2004, No. 2004-172945 filed in Japan on Jun. 10, 2004, and No. 2004-194865 filed in Japan on Jun. 30, 2004 the entire contents of which are hereby incorporated by reference.

BACKGROUND OF THE INVENTION

The present invention relates to an image processing system constructed by connecting a data processing apparatus for performing various kinds of data processing including data protection, to an existing image processing system.

In the prior art, a system has been proposed in which information processing apparatuses such as personal computers and image forming apparatuses such as printers and complex apparatuses are interconnected on a communication network, so that each image forming apparatus is shared by a plurality of the information processing apparatuses. Such a system is actually introduced into offices, stores, and the like. This has become possible because of the improvement in the speed of the image forming apparatuses itself as well the employment of auxiliary storage devices such as HDD (Hard Disk Drive) units into the image forming apparatuses. The employment of auxiliary storage devices has improved the processing capability of the systems into such a manner that a plurality of jobs are accepted without stagnation and then successively processed by image formation. Meanwhile, in such a system, a large number of users share an image forming apparatus, and hence much attention is recently focused on the security of data treated in the image forming apparatuses.

In such a situation, a system has been proposed in which encryption is performed on printing data transmitted between an information processing apparatus and an image forming apparatus on a communication network (for example, Japanese Patent Application Laid-Open No. H3-184477 (1991)). Further, a certain image forming apparatuses is provided with the function of so-called confidential printing (hold print) where a received print job is temporarily stored in the image forming apparatus, and then the printing is started in response to a password authentication or the like for the user (for example, Japanese Patent Application Laid-Open No. H7-276744 (1995)). Another image forming apparatus is provided with the function of deleting data stored in an HDD unit (for example, Japanese Patent Application Laid-Open No. H9-223061 (1997)).

Nevertheless, existing image forming apparatuses without a data protection function can be connected to a communication network in many cases. From the perspective of the security of the entire system, this causes a problem that a unified security environment cannot be proposed. Thus, in the prior art, a system has been proposed that is constructed from a host computer for controlling printers and from terminal units connected to the host computer, so that when printing data is transmitted from the terminal unit, the data is transmitted in an encrypted form. At a stage of performing the print processing, the host computer requests the transmission of a decryption key from a terminal unit. Then, decryption is performed on the printing data by using the decryption key transmitted in response to the request. Then, the print processing is performed (for example, Japanese Patent Application Laid-Open No. H4-178038 (1992)).

Nevertheless, in the construction of the system disclosed in Japanese Patent Application Laid-Open No. H4-178038 (1992), software for encrypting the printing data and software for generating the decryption key need be installed in each terminal unit. This causes a problem that much time and effort and a high cost are required in order to introduce the technique into an existing system. Further, in this system, the host computer requests the transmission of a decryption key from a terminal unit at a stage of performing print processing, and then the terminal unit transmits the decryption key in response to the request. This causes an increase in the traffic in comparison with an existing system. Thus, a problem of stagnation of the processes can arise especially when a large number of terminal units are present on the communication network.

BRIEF SUMMARY OF THE INVENTION

The invention has been devised with considering such situations, an object of the invention is to provide an image processing system in which a data processing apparatus is connected to an image processing apparatus so that various kinds of functions including a data protection function are imparted, and in which a situation that a data processing apparatus or an image processing apparatus having been connected has been removed is detected at an early stage and then notified to a user.

Another object of the invention is to provide an image processing system in which when a data processing apparatus or an image processing apparatus having been connected is removed, execution permitted processes are restricted so that the leakage, the unauthorized use, or the like of data is prevented that can occur when the data processing apparatus or the image processing apparatus is removed.

Yet another object of the invention is to provide an image processing system in which an additional processing apparatus is connected to an image processing apparatus not provided with the function of image data protection, so that image data protection is achieved.

Another object of the invention is to provide an image processing system comprising: connecting means for being connected to an image processing apparatus; and storage means for storing received data, so that the connection status of the image processing apparatus to the connecting means is detected. Then, on the basis of the detection result, the read out of the data stored in the storage means is suspended. This ensures the security of the image data treated in an existing system, without degradation in the processing efficiency.

Another object of the invention is to provide an image processing system comprising connecting means for being connected to an image processing apparatus, so that the status of connection to the image processing apparatus is detected. Then, on the basis of the detection result, the processing on inputted image data is suspended. This system is easily applicable to an existing system. This ensures the security of image data without degradation in the processing efficiency.

Another object of the invention is to provide an image processing system in which a data processing apparatus is connected to an image processing apparatus so that various kinds of functions are imparted. When a data processing apparatus is connected to the image processing apparatus, authentication is performed so that the connected data processing apparatus is permitted to operate effectively only when the connected data processing apparatus is appropriate one.

Another object of the invention is to provide an image processing system in which the result of authentication in an image processing apparatus is notified so that a user is informed of the permission or inhibition of the operation of the connected data processing apparatus.

An image processing system according to the invention is an image processing system constructed by interconnecting: a data processing apparatus for processing data inputted from an outside; and an image processing apparatus for performing image processing on the data processed by the data processing apparatus, wherein at least one apparatus selected from the data processing apparatus and the image processing apparatus includes: detecting means for detecting a status of connection to the other apparatus; and notifying means for notifying the detection result of the detecting means. In this image processing system, the data processing apparatus and the image processing apparatus are interconnected so that various kinds of functions including a data protection function are imparted to the image processing system. Then, at least one apparatus of the data processing apparatus and the image processing apparatus detects the status of connection to the other apparatus, and then notifies the detection result. By virtue of this, when these apparatuses are disconnected by a certain reason, the situation is informed to users in the vicinity, while an informing e-mail is transmitted to the administrator or the like. This effectively prevents data leakage and improves the security.

In the above-mentioned configuration of an image processing system according to the invention, the above-mentioned at least one apparatus includes power detecting means for detecting own power activation, while when the power detecting means detects power activation, the detecting means detects a status of connection to the other apparatus. In this configuration, the apparatus for detecting the status of connection to the other connected apparatus detects the status of connection to the other apparatus when the own power is turned ON. Thus, the situation whether these apparatuses have been disconnected during the power shut down is detected at a stage of various kinds of initial operation after the power activation, that is, at an early stage after the power activation.

In the above-mentioned configuration of an image processing system according to the invention, the above-mentioned at least one apparatus includes time counting means, while on the basis of a result of time counted by the time counting means, the detecting means detects a status of connection to the other apparatus periodically. In this configuration, the apparatus for detecting the status of connection to the other connected apparatus detects the status of connection to the other apparatus periodically. Thus, the situation whether these apparatuses have been disconnected is detected at an early stage.

In the above-mentioned configuration of an image processing system according to the invention, the above-mentioned at least one apparatus includes: identification information storing means for storing identification information for identifying the other apparatus; requesting means for requesting transmission of identification information from the connected apparatus; and acquiring means for acquiring identification information from the connected apparatus, while on the basis of comparison of the acquired identification information with the identification information stored in the identification information storing means, the detecting means detects a status of connection to the other apparatus. In this configuration, on the basis of the identification information imparted to the other apparatus, the apparatus for detecting the status of connection to the other connected apparatus determines whether the connection to the other apparatus is maintained. For example, on the basis of apparatus proper information such as the serial number, the manufacturer name, the model name, the user information, and the installation location information, the situation whether the connection to the apparatus connected in advance is maintained is determined. Thus, a situation that a different apparatus is connected is detected at an early stage. This efficiently prevents the leakage, the unauthorized use, or the like of the data that can occur when a different apparatus is connected.

In the above-mentioned configuration of an image processing system according to the invention, the above-mentioned at least one apparatus includes user detecting means for detecting presence of a user in a vicinity, while when the user detecting means detects the presence of a user, the notifying means notifies the detection result of the detecting means. In this configuration, when the presence of a user in the vicinity is detected, the apparatus for detecting the status of connection to the other connected apparatus notifies the detected status of connection of the data processing apparatus and the image processing apparatus. Thus, a situation that these apparatuses have been disconnected by a certain reason is ensured to be notified to the user in the vicinity. This effectively prevents data leakage and improves the security.

In the above-mentioned configuration of an image processing system according to the invention, the above-mentioned at least one apparatus includes restricting means for restricting an execution-permitted process when the detecting means detects no connection to the other apparatus. In this configuration, when a data processing apparatus or an image processing apparatus having been connected is removed, the apparatus having detected the removal of the connected apparatus restricts the execution permitted process. Thus, when read out of the data is restricted, the leakage and the unauthorized use of the data are prevented. This improves the security.

In the above-mentioned configuration of an image processing system according to the invention, the above-mentioned at least one apparatus includes canceling means for canceling the restriction on the execution-permitted process when the detecting means re-detects a connection to the other apparatus. In this configuration, when a data processing apparatus or an image processing apparatus having been removed once is re-connected, the apparatus having detected the connection of the other apparatus cancels the restriction on the execution permitted process. Thus, even when these apparatuses are disconnected by a certain reason, these apparatuses can operate normally when re-connected.

An image processing system according to the invention is an image processing system comprising: an image processing apparatus provided with processing means for processing image data; and an additional processing apparatus for performing a predetermined process in addition to processes performed by the processing means, wherein the additional processing apparatus is connected to the image processing apparatus in a manner that attachment and detachment are allowed, wherein the image processing apparatus includes: connecting means for connecting the additional processing apparatus; and control means for permitting the additional processing apparatus to perform the predetermined process in addition to the processes performed by the processing means, when the additional processing apparatus is connected to the connecting means, and wherein the additional processing apparatus includes protection processing means for performing a process of protecting image data as the predetermined process, when the additional processing apparatus is connected to the connecting means. In this image processing system, when an additional processing apparatus which may be connected to the image processing apparatus in a manner that the attachment and detachment is allowed is connected, the additional processing apparatus is allowed to perform a predetermined process in addition to the processes originally performed by the image processing apparatus. When connected to the image processing apparatus, the additional processing apparatus performs the process of protecting the image data processed by the image processing apparatus. In the case that the image processing apparatus has such a configuration that the process of protecting the image data is performed only when the additional processing apparatus is connected, the image data is protected from the unauthorized use of information. Further, the original image processing apparatus is not provided with the function of image data protection. This reduces the cost. Furthermore, even when the necessity of treating confidential information arises owing to a change in the operating condition of the image processing apparatus, the connection of merely the additional processing apparatus realizes the protection of image data from the unauthorized use of information in an already introduced image processing apparatus.

An image processing system according to the invention is an image processing system provided with connecting means for being connected to an image processing apparatus so as to perform transmission and reception of data to and from the image processing apparatus connected to the connecting means, comprising: storage means for storing received data; detecting means for detecting a connection status of the image processing apparatus to the connecting means; and suspending means for suspending read out of data stored in the storage means, on the basis of a detection result of the detecting means. In this configuration, the means for being connected to the image processing apparatus is provided so that the read out of the data stored in the storage means is suspended depending on the status of connection to an image processing apparatus. Thus, depending on the status of connection to an image processing apparatus such as a printer, a digital complex apparatus, and a scanner, the read out of the data can be suspended. This prevents data leakage.

In the above-mentioned configuration of an image processing system according to the invention, the detecting means includes determination means for determining whether the image processing apparatus connected to the connecting means is an image processing apparatus registered in advance, so that when an image processing apparatus different from the image processing apparatus registered in advance is being connected, read out is suspended for the data stored in the storage means. In this configuration, it is determined whether the connected image processing apparatus is one registered in advance. Then, when an image processing apparatus different from the image processing apparatus registered in advance is being connected, data read out is suspended. This prevents unauthorized data retrieval by means of replacement, duplication, or the like of an external device by a third party.

In the above-mentioned configuration of an image processing system according to the invention, further provided are: identification information storing means for storing identification information for identifying an image processing apparatus to be connected; requesting means for requesting transmission of identification information from an image processing apparatus connected to the connecting means; and receiving means for receiving the identification information transmitted from the image processing apparatus in response to the request, wherein on the basis of the received identification information and the identification information stored in the identification information storing means, the detecting means determines whether the image processing apparatus connected to the connecting means is the image processing apparatus registered in advance. In this configuration, the determination whether the connected image processing apparatus is one registered in advance is performed on the basis of identification information imparted to the image processing apparatus. That is, the determination whether the connected image processing apparatus is one registered in advance is performed on the basis of apparatus proper information such as the serial number, the manufacturer name, the model name, the user information, and the installation location information.

In the above-mentioned configuration of an image processing system according to the invention, further provided is notifying means for notifying a situation, when read out is suspended for the data stored in the storage means. In this configuration, when data read out is suspended, the situation is notified. Thus, when unauthorized behavior such as the replacement of an image processing apparatus is detected, users in the vicinity are notified, while the administrator or the like is informed by e-mail. This effectively prevents data leakage.

In the above-mentioned configuration of an image processing system according to the invention, further provided are: reception means for receiving user information; performing means for performing user authentication on the basis of the received user information; and canceling means for canceling the suspension of read out of the data stored in the storage means when the user authentication has been successful. In this configuration, the suspension of data read out is cancelled only when the user authentication has been successful. Thus, authorized persons as such an apparatus administrator are solely allowed to change connection status. This prevents data leakage by means of replacement or the like of an image processing apparatus.

An image processing system according to the invention is an image processing system for performing a process on inputted image data, comprising: connecting means for being connected to an image processing apparatus; detecting means for detecting a connection status of the image processing apparatus to the connecting means; and suspending means for suspending the process on the basis of a detection result of the detecting means. In this configuration, means for being connected to the image processing apparatus is provided so that the process performed on the image data is suspended on the basis of the status of connection to the image processing apparatus. Thus, the process of transmitting the data to the outside can be suspended depending on the status of connection to the image processing apparatus. This prevents data leakage.

In the above-mentioned configuration of an image processing system according to the invention, the detecting means detects a presence or absence of connection between the image processing apparatus and the connecting means, while when an absence of connection to the image processing apparatus is detected, the process is suspended. In this configuration, the status of connection to the image processing apparatus is detected so that when absence of the connection to the image processing apparatus is detected, the process performed on the image data is suspended. This allows the suspension of the process of transmitting the data to the outside, and hence prevents data leakage.

In the above-mentioned configuration of an image processing system according to the invention, the detecting means includes determination means for determining whether the image processing apparatus connected to the connecting means is an image processing apparatus registered in advance, so that when an image processing apparatus different from the image processing apparatus registered in advance is being connected, the process is suspended. In this configuration, it is determined whether the connected image processing apparatus is one registered in advance. Then, when an image processing apparatus different from the image processing apparatus registered in advance is being connected, the process performed on the image data is suspended. This prevents unauthorized data retrieval by means of replacement, duplication, or the like of the image processing apparatus device by a third party.

In the above-mentioned configuration of an image processing system according to the invention, further provided are: identification information storing means for storing identification information for identifying an image processing apparatus to be connected; requesting means for requesting transmission of identification information from an image processing apparatus connected to the connecting means; and receiving means for receiving the identification information transmitted from the image processing apparatus in response to the request, wherein on the basis of the received identification information and the identification information stored in the identification information storing means, the detecting means determines whether the image processing apparatus connected to the connecting means is the image processing apparatus registered in advance. In this configuration, the determination whether the connected image processing apparatus is one registered in advance is performed on the basis of identification information imparted to the image processing apparatus. Thus, the determination whether the connected image processing apparatus is one registered in advance is performed on the basis of apparatus proper information such as the serial number, the manufacturer name, the model name, the user information, and the installation location information.

In the above-mentioned configuration of an image processing system according to the invention, the above-mentioned process is a process of transmitting received image data to an outside. In this configuration, the process of transmitting received image data to the outside is suspended depending on the status of connection to the image processing apparatus. This prevents data leakage.

In the above-mentioned configuration of an image processing system according to the invention, further provided is notifying means for notifying a situation when the process is suspended. In this configuration, when the process performed on the image data is suspended, the situation is notified. Thus, when unauthorized behavior such as the replacement of the image processing apparatus is detected, users in the vicinity are notified, while the administrator or the like is informed by e-mail. This effectively prevents data leakage.

In the above-mentioned configuration of an image processing system according to the invention, further provided are: reception means for receiving user information; performing means for performing user authentication on the basis of the received user information; and canceling means for canceling the suspension of the process when the user authentication has been successful. In this configuration, when the user authentication has been successful, the suspension of the process performed on the image data is cancelled. Thus, authorized persons as such an apparatus administrator are solely allowed to change connection status. This prevents data leakage by means of replacement or the like of an image processing apparatus.

An image processing system according to the invention is an image processing system comprising: a data processing apparatus; and an image processing apparatus connected to the data processing apparatus via connecting means so as to perform image processing on data processed by the data processing apparatus, wherein the image processing apparatus comprises: connection detection means for detecting a status of connection to the data processing apparatus via the connecting means; authentication means for performing authentication when the connection detection means detects a connection to the data processing apparatus; and permission means for permitting transmission and reception of data to and from the data processing apparatus when the authentication has been successful in the authentication means. In this image processing system, the data processing apparatus is connected to the image processing apparatus so that various kinds of data processing functions are imparted to the image processing apparatus. Then, the image processing apparatus detects the status of connection to the data processing apparatus. When a connection to a data processing apparatus is detected, authentication is performed. Then, when the authentication has been successful, data transmission and reception to and from the data processing apparatus is permitted. That is, when the authentication has been unsuccessful, the image processing apparatus inhibits the data transmission and reception to and from data processing apparatus. This efficiently prevents the leakage, the unauthorized use, or the like of the data.

In the above-mentioned configuration of an image processing system according to the invention, the image processing apparatus includes notifying means for notifying a result of authentication in the authentication means. In this configuration, when a data processing apparatus is connected and then authentication is performed if necessary, the image processing apparatus notifies the result of authentication. Thus, the user is informed of whether the connected data processing apparatus is permitted to operate effectively. When the authentication has been unsuccessful, for example, an input prompt for prompting re-inputting of an authentication code is displayed for a re-authentication process.

The above and further objects and features of the invention will more fully be apparent from the following detailed description with accompanying drawings.

BRIEF DESCRIPTION OF THE SEVERAL VIEWS OF THE DRAWINGS

FIG. 7 is a flow chart showing a procedure performed in an image processing system of Embodiment 3;

FIG. 8 is a flow chart showing a procedure performed in an image processing system of Embodiment 3;

FIG. 9 is a conceptual diagram showing an example of a management table of Embodiment 4;

FIG. 13 is a conceptual diagram showing an example of a management table of Embodiment 5;

FIGS. 15A-15C are schematic diagrams showing an example of a screen displayed on a displaying section of an operation panel of Embodiment 5;

FIG. 20 is a flow chart showing a procedure performed in a complex apparatus (image processing apparatus) of Embodiment 6;

FIG. 21 is a schematic diagram showing the contents of registration in a function database of Embodiment 7;

FIGS. 23A and 23B are schematic diagrams showing the contents of registration in a function database of Embodiment 8;

FIG. 25 is a schematic diagram showing the contents of registration in a function database of Embodiment 9.

DETAILED DESCRIPTION OF THE INVENTION

The invention is described below in detail with reference to the drawings showing the embodiments.

Figure 1:
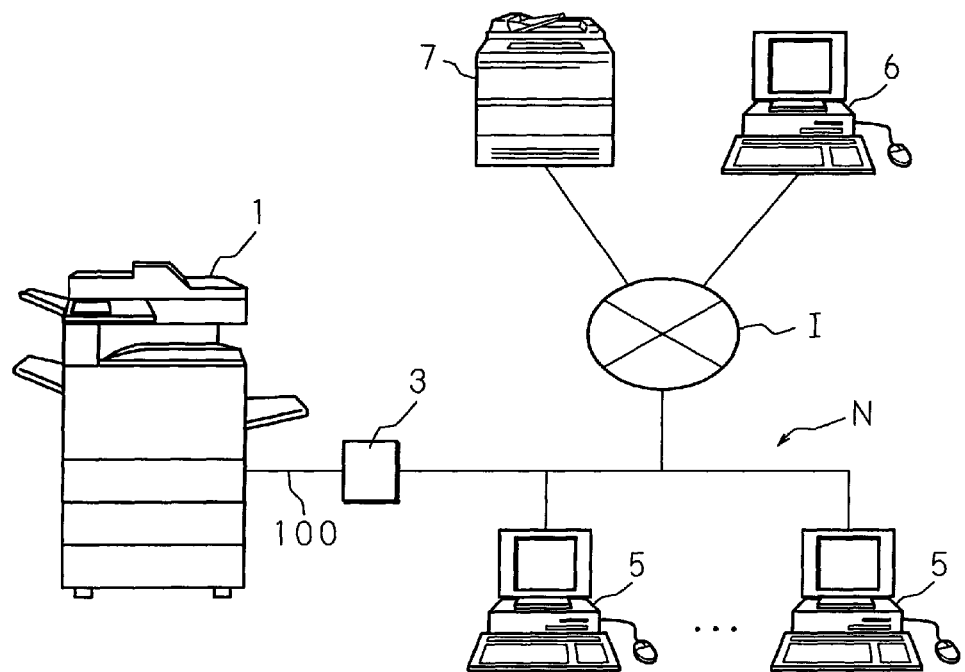
FIG. 1 is a schematic diagram showing an example of the configuration of an image processing system according to the invention.

FIG. 1 is a schematic diagram showing an example of the configuration of an image processing system according to the invention. In the figure, numeral 1 indicates a complex apparatus serving as an image processing apparatus of the invention. Numeral 3 indicates a security box serving as a data processing apparatus or an additional processing apparatus of the invention. The complex apparatus 1 has a print function, a copy function, and a scanner function. The complex apparatus 1 is connected to the security box 3 via a USB (Universe Serial Bus) cable 100, and further is connected to a communication network N via the security box 3.

On the communication network N; computers 5, 5 . . . are connected in each of which a computer program (driver program) for utilizing the complex apparatus 1 is installed. Print jobs generated by the computers 5, 5 . . . on the basis of documents, graphics, or the like are transmitted to the complex apparatus 1, so that image processing is performed. The communication network N is connected to the Internet I.

Thus, a computer 6 and an Internet facsimile 7 on the Internet I can similarly perform data transmission and reception to and from the complex apparatus 1 via the communication network N.

The complex apparatus 1 itself is not provided with a data protection function such as a hold print function, a confidential function, and an encryption function. However, when combined with the security box 3, these protection functions are imparted. That is, the security box 3 includes: a data processing section for encrypting received data; and a data storage section for retaining the received data (see FIG. 2).

Figure 2:
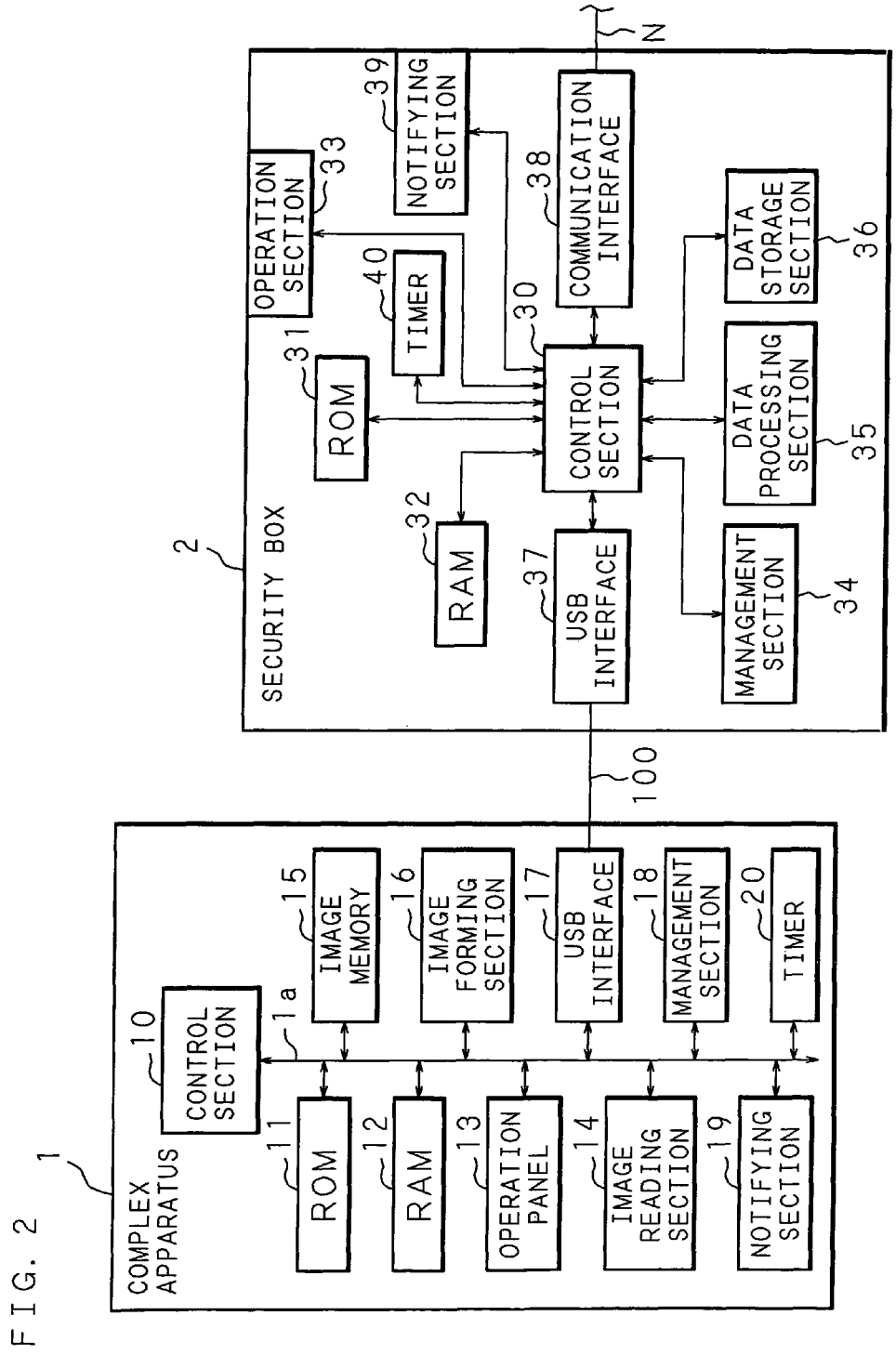
FIG. 2 is a block diagram showing an example of the internal configuration of a complex apparatus (an image processing apparatus) and a security box (a data processing apparatus or an additional processing apparatus)

FIG. 2 is a block diagram showing an example of the internal configuration of the complex apparatus 1 and the security box 3. The complex apparatus 1 comprises a control section 10, a ROM 11, a RAM 12, an operation panel 13, an image reading section 14, an image memory 15, an image forming section 16, a USB interface 17, a management section 18, a notifying section 19, and a timer 20. These are connected with each other via a bus 1a.

The control section 10 comprises a CPU (Central Processing Unit) or an MPU (Micro Processor Unit), and controls the above-mentioned hardware components connected via the bus 1a and. Further, the control section 10 loads onto the RAM 12 an appropriate control program stored in advance in the ROM 11, and then executes the program. The ROM 11 stores in advance various control programs necessary for causing the complex apparatus 1 to serve as an image processing apparatus of the invention. The RAM 12 is composed of an SRAM or a flash memory, and temporarily stores data generated at the run time of the control program executed by the control section 10.

The operation panel 13 comprises: an operation section for receiving a user's operation instruction; and a displaying section for displaying information to be notified to the user. The operation section is provided with various kinds of operation keys used by the user for inputting an operation instruction, and thereby receives user instructions including: the setting of operation values such as the number of sheets to be printed and the copy density; the switching of functions; and an output start instruction. The displaying section comprises a liquid crystal display, and thereby displays: the operation status of the complex apparatus 1; various kinds of setting values inputted through the operation section; and information to be notified to the user.

The image reading section 14 is a scanner unit comprising: a light source for irradiating with light a manuscript to be read; an image sensor employing a CCD (Charge Coupled Device) or the like; and an A/D converter. In the image reading section 14, the image of a manuscript placed at a predetermined reading position is formed on the image sensor, and thereby converted into an analog electric signal. The obtained analog electric signal is A/D-converted by the A-D converter. Then, the digital signal obtained by the A/D conversion is corrected with respect to the light distribution characteristic of the light source at the time of manuscript reading, the sensitivity unevenness of the image sensor, and the like. As such, image data of digital format is generated and stored into the image memory 15.

The image memory 15 is composed of a DRAM or the like, and temporarily stores: data generated by the image reading section 14 having read the image of the manuscript; image data acquired by expanding a print job received from the outside via the security box 3; and the like. The image data temporarily stored in the image memory 15 is transmitted to an appropriate destination depending on the purpose of utilization. Specifically, image data used for image formation onto a print sheet is transmitted to the image forming section 16, while image data to be transmitted intact to a computer 5 and image data to be stored intact into a computer 5 are transmitted to the USB interface 17.

The image forming section 16 comprises, for example: an electrostatic charging unit for charging a photosensitive drum into a predetermined potential; a laser writing unit for emitting a laser beam on the basis of the image data, and thereby generating an electrostatic latent image on the photosensitive drum; a developing unit for supplying toner onto the electrostatic latent image formed in the photosensitive drum surface, and thereby generating a visible image; and a transfer unit for transferring the toner image formed on the photosensitive drum surface onto a print sheet such as a paper sheet and an OHP film (these units are not shown). Then, the image forming section 16 forms an image desired by the user, on a print sheet by electrophotography. In this example, the image forming section 16 performs image formation by electrophotography using a laser writing unit. However, an inkjet method, a thermal ink transfer method, or a sublimation method may instead be adopted in the image formation.

The USB interface 17 is an interface for the connection through the USB cable 100, and comprises an SIE (Serial Interface Engine) for performing data transmission and reception through the USB cable 100.

The management section 18 comprises a flash memory or the like, and stores: information concerning the hardware constituting the complex apparatus 1; and information concerning the inner status of the apparatus. At the power activation, the management section 18 communicates with the hardware components, and thereby acquires the information described here. Further, the management section 18 periodically monitors the status of the hardware in operation, and thereby updates the contents of the management information when necessary.

The notifying section 19 comprises a notifying lamp composed of an LED (Light Emitting Diode) or the like, and notifies information to the user, in the form of ON-OFF state of the lamp. The timer 20 performs time counting.

As shown in FIG. 2, the security box 3 comprises a control section 30, a ROM 31, a RAM 32, an operation section 33, a management section 34, a data processing section 35, a data storage section 36, a USB interface 37 for the connection through the USB cable 100, a communication interface 38 for the connection to the communication network N, a notifying section 39 for notifying abnormality to the user, and a timer 40 for performing time counting. These components except for the control section 30 itself are connected to the control section 30, and thereby operate under the control of the control section 30.

The control section 30 comprises a CPU or an MPU, and controls the hardware components connected as described above. Further, the control section 30 loads onto the RAM 32 an appropriate control program stored in advance in the ROM 31, and then executes the program. The ROM 31 stores in advance various control programs for causing the security box 3 to serve as a data processing apparatus of the invention. The RAM 32 is composed of an SRAM or a flash memory, and temporarily stores data generated at the run time of the control program executed by the control section 30. The operation section 33 is provided with various kinds of operation keys used by the user for inputting an operation instruction.

The USB interface 37 is an interface for the connection through the USB cable 100, and comprises an SIE for performing data transmission and reception through the USB cable 100. The communication interface 38 is an interface in accordance with a telecommunication standard of the communication network N. This communication interface 38 receives print jobs from the computers 5 connected to the communication network N, and transmits information to be notified to these computers 5. The management section 34 comprises a flash memory or the like, and stores an identification number for identifying the security box 3.

The data processing section 35 has a function of performing a predetermined process on the data to be transmitted and received through the USB interface 37 or the communication interface 38. The processes performed by the data processing section 35 include: the process of expanding image data from a print job received through the communication interface 38; the process of encrypting image data stored in the data storage section 36; and the process of decryption performed when encrypted data is read from the data storage section 36. Thus, the data processing section 35 comprises: an interpreter for interpreting PDL (Page Description Language) used as the description language of the print job; an encryption circuit for encrypting data according to a predetermined algorithm; and a decryption circuit for decrypting data according to a predetermined algorithm. Here, each of the encryption circuit and the decryption circuit may be implemented as a software based function in which a control program for performing a predetermined encryption or decryption process is stored in a memory or the like and executed by the control section 30.

The data storage section 36 comprises a nonvolatile memory or an HDD. A part of the storage area is used as a storage area for storing image data obtained by expanding a received print job. When a request is received from an external apparatus via the USB interface 37 or the communication interface 38, the image data stored in the data storage section 36 is read out and then transmitted to the requesting source apparatus (the complex apparatus 1 or a computer 5).

(Embodiment 1)

In the management section 18 serving as an identification information storing section, a part of the storage area stores: an identification number (identification information) for identifying the complex apparatus (image processing apparatus) 1; and an identification number for identifying the security box (data processing apparatus) 3 connected via the USB cable 100. The identification number for the complex apparatus 1 itself may be the serial number, the manufacturer name, the model name, the user information, the installation location information, or the like, and is proper information inputted in advance at manufacturing or installation of the apparatus. Similarly to the identification number of the complex apparatus 1, the identification number of the security box 3 is the serial number, the manufacturer, the model, user information, installation location information, or the like. At the first time of connection to the security box 3, the complex apparatus 1 requests and acquires the identification number from the security box 3. The identification number of the security box 3 may be inputted in advance through the operation panel 13 by a system administrator or the like.

When detecting that the security box 3 having been connected via the USB cable 100 is removed, or alternatively when detecting that a security box different from the predetermined one is connected, the notifying section (notifying lamp) 19 is turned ON, and thereby notifies the situation to a user near the complex apparatus 1.

In the management section 34 in the security box 3, a part of the storage area stores an identification number for identifying the security box 3. The identification number for the security box 3 itself may be the serial number, the manufacturer name, the model name, the user information, the installation location information, or the like, and is apparatus proper information inputted in advance at manufacturing or installation of the apparatus. The identification number stored in the management section 34 is transmitted to the complex apparatus 1 in response to a transmission request from the complex apparatus 1.

In Embodiment 1, in order that the removal of the security box 3 connected to the complex apparatus 1 should be detected at an early stage, the complex apparatus 1 periodically acquires the proper information of the security box 3, and thereby detects the connection status. Thus, when the connection is dissolved, or alternatively when a security box different from the predetermined one is connected, the situation is notified to the outside. Obviously, when the connection to the security box 3 is dissolved, or alternatively when a security box different from the predetermined one is connected, the complex apparatus 1 is not permitted to perform various functions permitted when the appropriate security box 3 is connected.

In the image processing system having the above-mentioned configuration, the control section 10 of the complex apparatus 1 serves as a power detecting section for detecting that the own power becomes ON when the complex apparatus 1 is powered ON. This function is attained by receiving a notification of that situation from a power supply section (not shown). The control section 10 serves also as a detecting section for detecting whether the connection to the security box 3 through the USB interface 17 is maintained when the power is turned ON.

Specifically, the control section 10 requests the transmission of an identification number from the security box 3. In response to this request, the control section 30 of the security box 3 transmits to the complex apparatus 1 the identification number of the security box 3 itself stored in the management section 34. When no response is returned from the security box 3 within a predetermined time after the request of transmission of the identification number of the security box 3, or alternatively when the identification number transmitted from the security box 3 differs from the identification number of the security box 3 stored in advance in the management section 18 of the complex apparatus 1, the control section 10 of the complex apparatus 1 detects that the appropriate security box 3 is not connected.

When the connection to the security box 3 is dissolved, the control section 10 of the complex apparatus 1 displays a warning screen indicating that the security box 3 has been removed, on the displaying section of the operation panel 13. At the same time, the notifying section 19 is turned ON. Thus, the user of the complex apparatus 1 is notified that the security box 3 is removed from the complex apparatus 1. Further, when the connection to the security box 3 is dissolved, the complex apparatus 1 restricts the execution of the processes permitted only when the security box 3 is connected. Specifically, these restricted functions are data protection functions such as a hold print function, a confidential function, and an encryption function.

The control section 10 of the complex apparatus 1 measures a predetermined time using the timer 20. At each time that the predetermined time has been elapsed, the control section 10 monitors the USB interface 17 similarly to the above-mentioned operation, and thereby detects the status of connection to the security box 3. When detecting that the security box 3 that has been removed is re-connected, the control section 10 terminates the display of the warning screen and the ON indication of the notifying section 19, and permits the execution of the processes that had been restricted when the connection to the security box 3 was dissolved.

Figure 3:
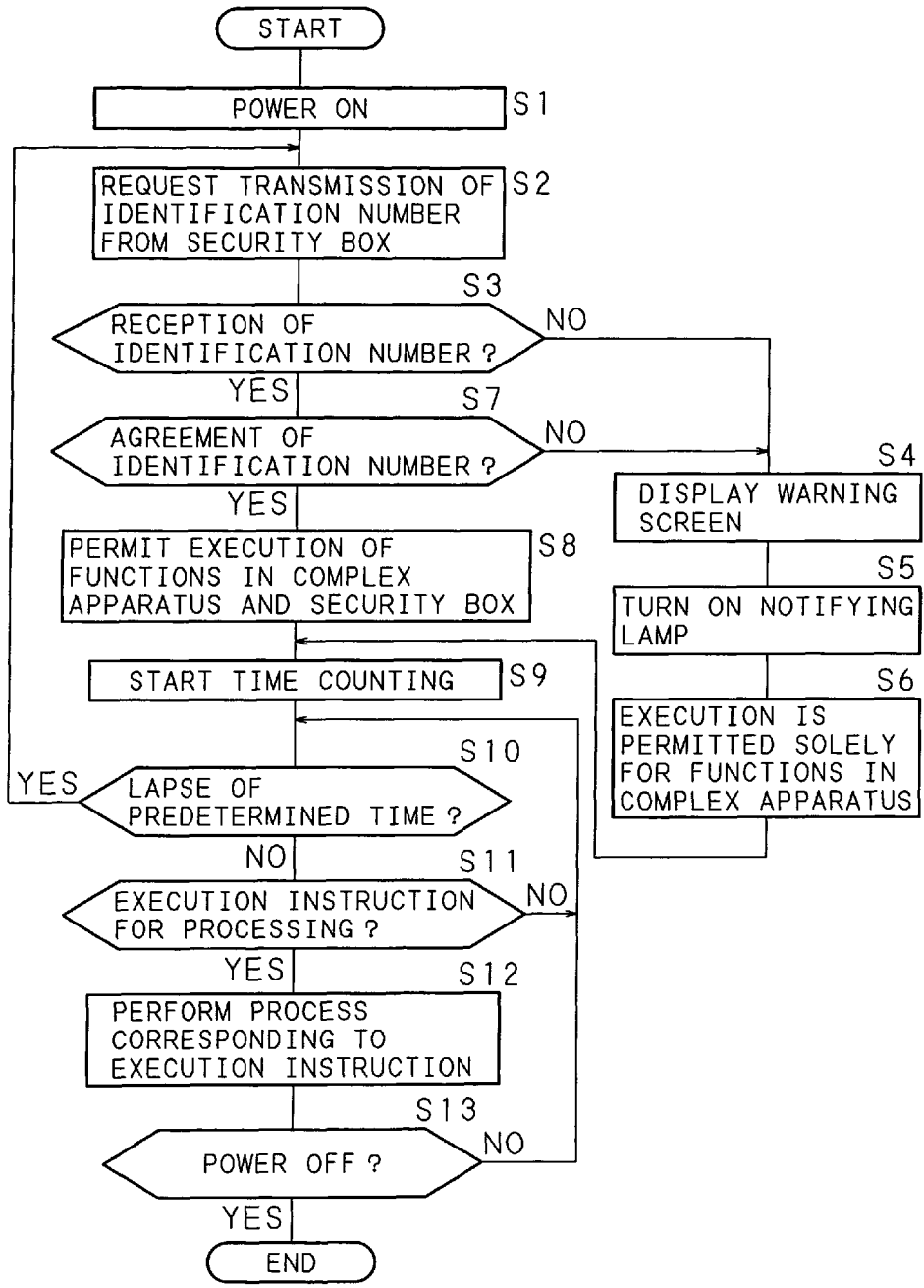
FIG. 3 is a flow chart showing a procedure performed in a complex apparatus (image processing apparatus) of Embodiment 1.

Described below is the operation of the complex apparatus 1 of the configuration of having described above. FIG. 3 is a flow chart showing the procedure of a process performed by the complex apparatus 1 of Embodiment 1. The complex apparatus 1 and the security box 3 are each provided with a power button, so that each is powered ON in response to the operation of the power button by a user. The following process is performed by the control section 10 according to the control program stored in the ROM 11 in advance.

When the complex apparatus 1 is powered ON (S1), the control section 10 requests the transmission of an identification number from the security box 3 (S2), and then waits for the reception of the identification number from the security box 3. The control section 10 determines whether the identification number has been received from the security box 3 within a predetermined time (S3). When received (S3: YES), the control section 10 reads out onto the RAM 12 the identification number of the security box 3 already stored in the management section 18, and then determines whether the identification number agrees with the received identification number (S7).

When no identification number is received from the security box 3 (S3: NO), or alternatively when the received identification number does not agree with the identification number stored in the management section 18 (S7: NO), the control section 10 displays a warning screen indicating that the appropriate security box 3 is not connected through the USB cable 100, on the displaying section of the operation panel 13 (S4). At the same time, the notifying section (notifying lamp) 19 is turned ON (S5). Further, execution is restricted for the processes permitted only when the security box 3 is connected, so that execution is permitted solely for the functions originally provided in the complex apparatus 1 (S6).

On the other hand, when the received identification number agrees with the identification number stored in the management section 18 (S7: YES), and when execution is restricted for the processes permitted only when the security box 3 is connected, the control section 10 cancels this restriction, and permits the execution of the functions provided in the complex apparatus 1 and the security box 3 (S8).

Then, the control section 10 starts the time counting using the timer 20 (S9), and determines whether a predetermined time has elapsed (S10). At each time that the predetermined time has elapsed (S10: YES), the procedure returns to the process S2, and detects whether the status of connection to the security box 3 is maintained. In contrast, as a result of the time counting using the timer 20, when the predetermined time has not yet elapsed (S10: NO), the control section 10 determines whether any execution instruction for processing has been inputted by means of the operation of the operation panel 13 by a user or of reception of a data processing command from the connected security box 3 (S11).

When an execution instruction for processing has been inputted (S11: YES), the control section 10 performs a process corresponding to the execution instruction (S12). When no execution instruction for processing has been inputted (S11: NO), the procedure returns to the process S10. Further, the control section 10 determines whether the power is turned OFF (S13). When the power is turned OFF (S13: YES), the control section 10 terminates the procedure. When the power is not turned OFF (S13: NO), the procedure returns to the process S10.

As such, in Embodiment 1, in addition to the functions originally provided in the complex apparatus 1, data protection functions and the like are imparted when the complex apparatus 1 is connected to the security box 3. This improves the capability of document security protection in the complex apparatus 1. Further, when the expected connection of the complex apparatus 1 to the security box 3 is dissolved, the complex apparatus 1 notifies that the security box 3 has been removed. This allows the user to be notified of the situation at an early stage. This efficiently prevents the leakage, the unauthorized use, or the like of the data.

In Embodiment 1 described above, the complex apparatus 1 has notified that the security box 3 has been removed, by means of displaying a warning screen and turning ON the notifying section 19. However, a warning sound may be outputted for the notification. Further, a revolving light may be turned ON. Further, the complex apparatus 1 may be provided with a sensor (detection means) for detecting a user in the vicinity, so that when a user approaches the complex apparatus 1, the notification may be performed efficiently.

(Embodiment 2)

An image processing system of Embodiment 2 is described below. When the control section 30 detects an abnormality such as that the security box 3 is removed from the complex apparatus (image processing apparatus) 1 so that the communication with the complex apparatus 1 is disconnected, the notifying section 39 in the security box (data processing apparatus) 3 notifies the situation to a user in the vicinity. For the purpose of this, the notifying section 39 comprises: an alarm outputting section for outputting a warning sound or voice; a display panel such as an LCD (Liquid Crystal Display) for displaying a warning message; and a warning light output section such as an LED and a revolving light.

In Embodiment 2, in order that the dissolution of the necessary connection of the complex apparatus 1 to the security box 3 should be detected at an early stage, the security box 3 acquires the proper information of the complex apparatus 1 from the complex apparatus 1, and thereby detects the connection status. Then, when the connection is dissolved, or alternatively when a complex apparatus different from the predetermined one, the notifying section 39 notifies the situation to the user in the vicinity. Further, an e-mail is transmitted to a predetermined computer 5 connected to the communication network N. Here, it is assumed that even when the security box 3 is removed from the complex apparatus 1, the security box 3 is connected to the communication network N.

That is, the control section 30 of the security box 3 serves as a power detecting section for detecting that the own power becomes ON when the security box 3 is powered ON. This function is attained by receiving a notification of that situation from a power supply section (not shown). The security box 3 serves also as a detecting section for detecting whether the connection to the complex apparatus 1 through the USB interface 37 is maintained when the power is turned ON.

Specifically, the control section 30 requests the transmission of the identification number from the complex apparatus 1. In response to this request, the control section 10 of the complex apparatus 1 transmits to the security box 3 the identification number of the complex apparatus 1 stored in the management section 18. When no response is returned from the complex apparatus 1 within a predetermined time after the request of transmission of the identification number of the complex apparatus 1, or alternatively when the identification number transmitted from the complex apparatus 1 differs from the identification number of the complex apparatus 1 stored in advance in the management section 34 of the security box 3, the control section 30 of the security box 3 detects that the appropriate complex apparatus 1 is not connected through the USB cable 100.

In the security box 3 where the connection to the complex apparatus 1 is dissolved, the control section 30 notifies through the notifying section 39 to the user that the security box 3 has been removed from the complex apparatus 1. Further, the security box 3 having been removed from the complex apparatus 1 restricts the operation of read out or the like of data from the data storage section 36.

The control section 30 of the security box 3 measures a predetermined time using the timer 40. At each time that the predetermined time has been elapsed, the control section 30 monitors the USB interface 37 similarly to the above-mentioned operation, and thereby detects the status of connection to the complex apparatus 1. When detecting that the complex apparatus 1 that has been removed is re-connected, the control section 30 terminates the informing process through the notifying section 39, and permits the execution of the operations that has been restricted.

Figure 4:
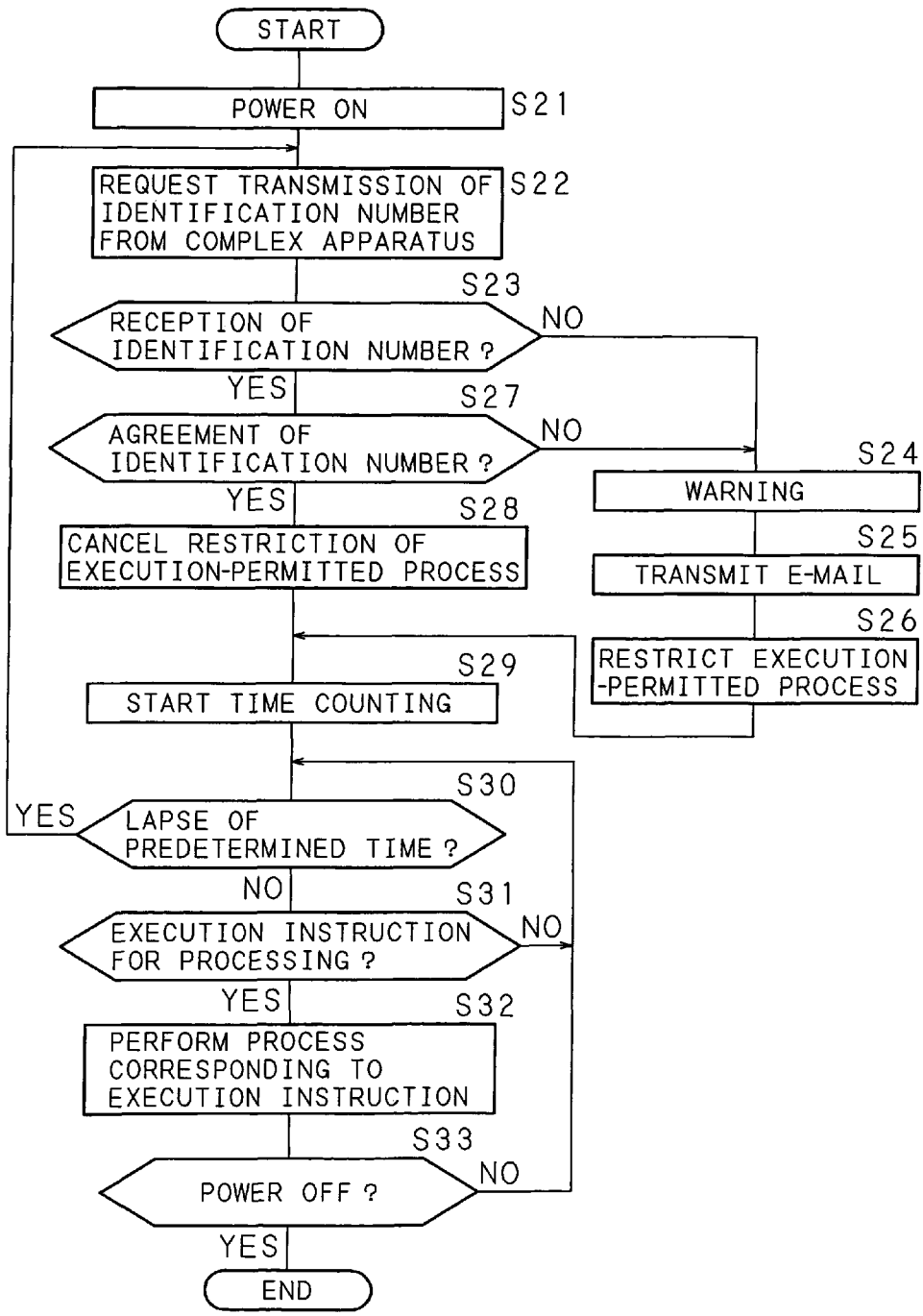
FIG. 4 is a flow chart showing a procedure performed in a security box (data processing apparatus) of Embodiment 2.

Described below is the operation of the security box 3 having the above-mentioned configuration. FIG. 4 is a flow chart showing a procedure performed in the security box 3 of Embodiment 2. The complex apparatus 1 and the security box 3 are each provided with a power button, so that each is powered ON in response to the operation of the power button by a user. The following process is performed by the control section 30 according to the control program stored in the ROM 31 in advance.

When the security box 3 is powered ON (S21), the control section 30 requests the transmission of an identification number from the complex apparatus 1 (S22), and then waits for the reception of the identification number from the complex apparatus 1. The control section 30 determines whether the identification number has been received from the complex apparatus 1 within a predetermined time (S23). When received (S23: YES), the control section 30 reads out onto the RAM 32 the identification number of the complex apparatus 1 already stored in the management section 34, and then determines whether the identification number agrees with the received identification number (S27).

When no identification number is received from the complex apparatus 1 (S23: NO), or alternatively when the received identification number does not agree with the identification number stored in the management section 34 (S27: NO), the control section 30 warns the user in the vicinity through the notifying section 39 that the appropriate complex apparatus 1 is not connected via the USB cable 100 (S24). At the same time, an e-mail to a predetermined computer 5 is generated and transmitted through the communication interface 38 (S25). Further, the control section 30 restricts the execution-permitted process such as communication processing performed through the USB interface 37 and the communication interface 38 (S26), and thereby restricts the read out of the data stored in the data storage section 36.

On the other hand, when the received identification number agrees with the identification number stored in the management section 34 (S27: YES), and when the process such as communication processing performed through the USB interface 37 and the communication interface 38 is restricted, the control section 30 cancels this restriction (S28), and permits the execution of the functions provided in the complex apparatus 1 and the security box 3.

Then, the control section 30 starts the time counting using the timer 40 (S29), and determines whether a predetermined time has elapsed (S30). At each time that the predetermined time has elapsed (S30: YES), the procedure returns to the process S22, and detects whether the status of connection to the complex apparatus 1 is maintained. In contrast, as a result of the time counting using the timer 40, when the predetermined time has not yet elapsed (S30: NO), the control section 30 determines whether any execution instruction for processing has been inputted by means of the operation of the operation panel 33 by a user or of reception of a data processing command from the connected complex apparatus 1 or a computer 5 (S31).

When an execution instruction for processing has been inputted (S31: YES), the control section 30 performs a process corresponding to the execution instruction (S32). When no execution instruction for processing has been inputted (S31: NO), the procedure returns to the process S30. The control section 30 determines whether the power is turned OFF (S33). When the power is turned OFF (S33: YES), the control section 30 terminates the procedure. When the power is not turned OFF (S33: NO), the procedure returns to the process S30.

As such, in Embodiment 2, the complex apparatus 1 is connected to the security box 3, so that in addition to the functions originally provided in the complex apparatus 1, data protection functions and the like are imparted. This improves the capability of document security protection in the complex apparatus 1. Further, when the expected connection of the complex apparatus 1 to the security box 3 is dissolved, the security box 3 notifies that the complex apparatus 1 has been removed. This allows the user to be notified of the situation at an early stage. This efficiently prevents the leakage, the unauthorized use, or the like of the data.

Also in the image processing system in Embodiment 2 described here, the modifications described in Embodiment 1 are similarly employable. In the configuration of the image processing system of Embodiment 1 described above, the complex apparatus 1 has the function of notifying the situation when itself has been disconnected from the security box 3. In contrast, in the configuration of the image processing system of Embodiment 2, the security box 3 has the function of notifying the situation when itself has been disconnected from the complex apparatus 1. Thus, both of the complex apparatus 1 and the security box 3 may detect appropriately the status of connection to the appropriate partner. Then, when the connection to the partner is dissolved, the user may be notified.

(Embodiment 3)

The complex apparatus (image processing apparatus) 1 is not provided with the function of protecting the image data to be processed. Thus, in a state that the security box (additional processing apparatus) 3 serving as an additional processing apparatus is not connected, the image data is processed without protection. When the security box 3 is connected to the complex apparatus 1, in addition to the processes originally performed by the complex apparatus 1, the security box 3 performs the process of protecting the image data. The image processing system of the embodiment 3 comprising the complex apparatus 1 and the security box 3 performs: an encryption process for image data transmitted and received by the complex apparatus 1 via the communication network N; and a hold process to be performed when the complex apparatus 1 outputs an image on the basis of image data transmitted from a computer 5 (in this process, when image data is received, the image data is stored in a state suspending the output, and then an image processing instruction issued by a user's direct operation is awaited in this state).

Figure 5:
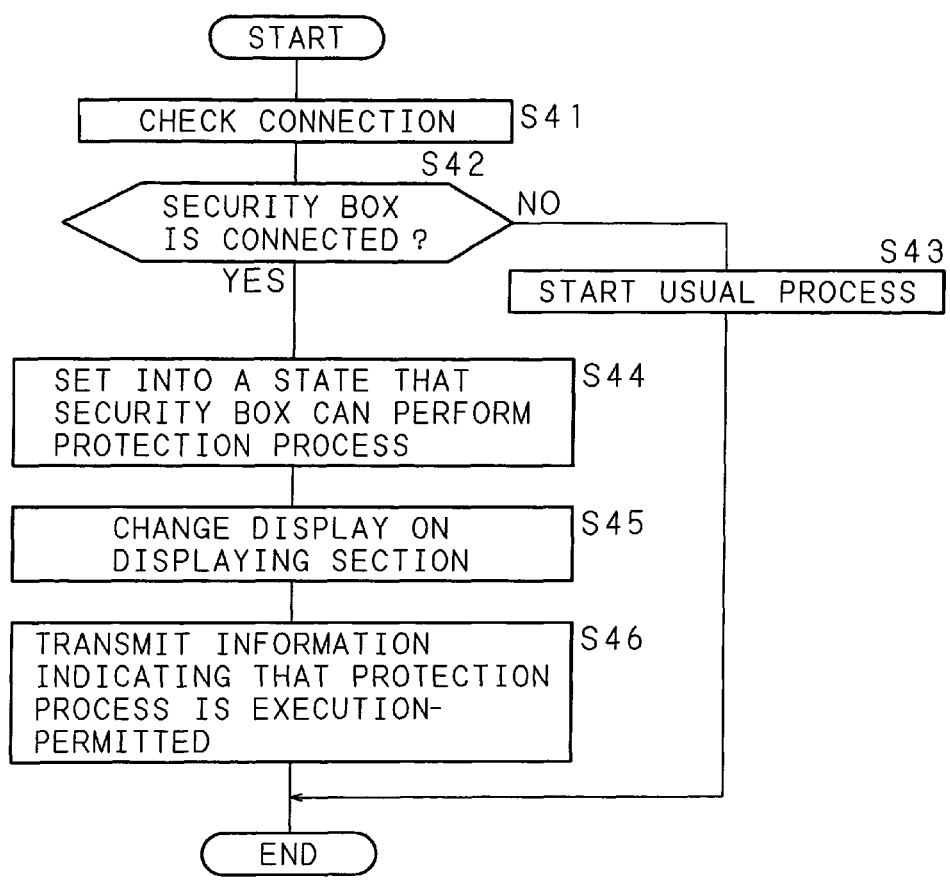
FIG. 5 is a flow chart showing a procedure performed in a complex apparatus (image processing apparatus) of Embodiment 3.

FIG. 5 is a flow chart showing the procedure of a process performed at initial startup by the complex apparatus 1. According to a control program and an additional processing control program stored in the ROM 11, the control section 10 of the complex apparatus 1 performs the following process. When the complex apparatus 1 is powered ON, or alternatively when the complex apparatus 1 is reset, the control section 10 checks the external apparatus connected via the USB interface 17 (S41). Then, on the basis of the result of connection check, the control section 10 determines whether the security box 3 (additional processing apparatus) is connected via the USB interface 17 (S42). When the security box 3 is not connected (S42: NO), the control section 10 starts usual process where the image data to be processed is not protected (S43), and then completes the process to be performed at startup.

When the security box 3 is connected via the USB interface 17 (S42: YES), the control section 10 sets the internal status of the complex apparatus 1 into a state that the security box 3 can perform a protection process (S44). Next, the control section 10 changes the displayed screen on the displaying section into a state that the operation panel 13 can receive through the operation panel 13 an instruction for a process performed by the security box 3 (S45).

Figure 6A:
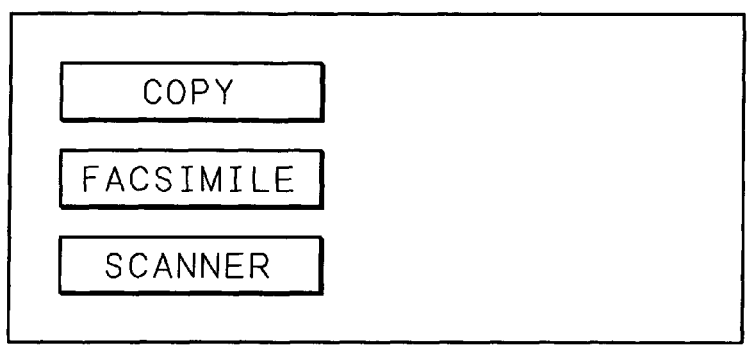
FIGS. 6A and 6B are schematic diagrams showing an example of display on a touch panel of Embodiment 3.
Figure 6B:
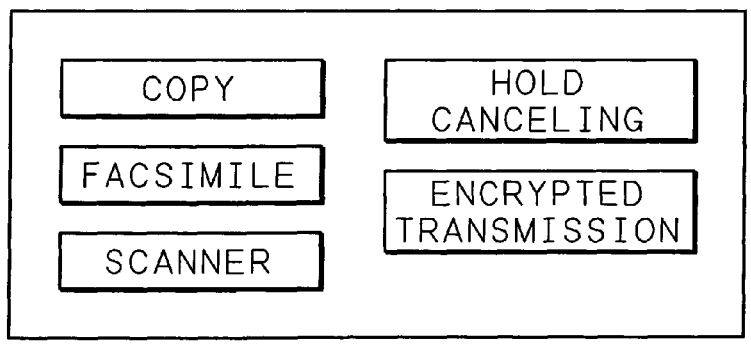

FIGS. 6A and 6B are schematic diagrams showing an example of change in the displayed screen on a touch panel in the case that the operation panel 13 is provided with a touch panel. FIG. 6A shows an example of displayed screen on the touch panel in the case that the security box 3 is not connected to the complex apparatus 1. This screen includes buttons each for receiving an instruction for a usual process such as copy, facsimile transmission, and scanner processing performed by the complex apparatus 1. FIG. 6B shows an example of changed displayed screen on the touch panel in the case that the security box 3 is connected the complex apparatus 1 so that the process of protecting the image data can be performed. In addition to the above-mentioned buttons, this screen includes: a button for receiving from the user a hold canceling instruction specifying that image data having been held by a hold process should be processed; and a button for receiving an encrypted transmission instruction specifying that image data to be transmitted to the outside should be encrypted before the transmission. When the user operates the operation panel 13 by using the display newly added on the touch panel, the image processing system performs image processing together with the process of protecting the image data.

Then, the control section 10 transmits information indicating that the protection process is execution-permitted, through the USB interface 17 to a predetermined computer 5 of the user of the image processing system (S46). Then, the procedure is completed. As such, the user is informed that the protection processes are execution-permitted. This allows the image processing system to perform an appropriate process depending on the situation.

FIG. 7 is a flow chart showing the procedure of a process performed by the image processing system of Embodiment 3 in the reception of image data. The control section 30 of the security box 3 monitors that the communication interface 38 receives image data and a processing instruction such as output instruction for the image data which are transmitted via the communication network N from a computer 5 (S51). When no image data and no processing instruction is received (S51: NO), the control section 30 continue to monitor the reception of image data and a processing instruction. When image data and a processing instruction are received in the communication interface 38 (S51: YES), the image data and the processing instruction having been received are stored into the data storage section 36 (S52). Then, the data processing section 35 determines whether an instruction of hold processing is included in the received processing instruction (S53). When an instruction for hold processing is included in the processing instruction (S53: YES), in the state that the data storage section 36 stores the image data and the processing instruction, the control section 30 transmits through the USB interface 37 the reception information indicating that the image data has been received by the complex apparatus 1 (S54).

The complex apparatus 1 receives through the USB interface 17 the reception information transmitted from the security box 3 (S55). Then, the control section 10 monitors the reception of a hold canceling instruction for the image data held in the security box 3 (S56). This instruction is issued by a user's operation of the operation panel 13. When no hold canceling instruction is received (S56: NO), the control section 10 continue to monitor the reception of a hold canceling instruction. When a hold canceling instruction is received through the operation panel 13 in response to a user's operation of the operation panel 13 (S56: YES), the control section 10 transmits the hold canceling instruction through the USB interface 17 to the security box 3 (S57).

The security box 3 receives through the USB interface 37 the hold canceling instruction transmitted from the complex apparatus 1 (S58). When the process S58 is completed, or alternatively when on instruction for hold processing is included in the processing instruction (S53: NO), the data processing section 35 of the security box 3 determines whether the image data is encrypted (S59). When the image data is encrypted (S59: YES), the data processing section 35 decrypts the image data stored in the data storage section 36 (S60). When the process S60 is completed, or alternatively when the image data is not encrypted (S59: NO), the control section 30 transmits the image data and the processing instruction through the USB interface 37 to the complex apparatus 1 (S61). Then, the data processing section 35 deletes the image data and the processing instruction stored in the data storage section 36 (S62). Then, the security box 3 completes the procedure.

The complex apparatus 1 receives through the USB interface 17 the image data and the processing instruction transmitted from the security box 3 (S63). The control section 10 performs a process for the image data according to the processing instruction (S64). The process performed here is, for example, that an image is formed from the image data in the image forming section 16, or that the image data is transmitted by facsimile communication. Then, the procedure is completed.

FIG. 8 is a flow chart showing the procedure of a process performed by the image processing system of Embodiment 3 in the transmission of image data. The control section 10 of the complex apparatus 1 monitors that an instruction for transmitting the image data generated by the image reading section 14 or the image data stored in the image memory 15 is received in response to a user's operation of the operation panel 13 (S71). At that time, the complex apparatus 1 may receive the specification of the image data to be transmitted and the specification of the transmission destination computer 5 for the image data, and may receive an instruction for transmitting encrypted image data. When no image data transmission instruction is received (S71: NO), the control section 10 continue to monitor the reception of a transmission instruction. When a transmission instruction for the image data is received through the operation panel 13 (S71: YES), the control section 10 transmits through the USB interface 17 the image data and the transmission instruction to the security box 3 (S72).

The security box 3 receives through the USB interface 37 the image data and the transmission instruction transmitted from the complex apparatus 1 (S73). Then, the data processing section 35 determines whether an instruction for the encryption of the image data is included in the received transmission instruction (S74). When no instruction for the encryption of the image data is included in the received transmission instruction (S74: NO), the control section 30 transmits the image data through the communication interface 38 to the computer 5 specified in the received transmission instruction (S75). Then, the procedure is completed. When an instruction for the encryption of the image data is included in the received transmission instruction (S74: YES), the data processing section 35 encrypts the image data (S76). Then, the control section 30 transmits through the communication interface 38 the encrypted image data to the computer 5 specified in the received transmission instruction (S77). Then, the procedure is completed.

In the process described above, the security box 3 has performed the process of relaying the transmission and reception of the information between the complex apparatus 1 and the computer 5. Similarly, the process may be performed that relays the transmission and reception of the information between the computer 6 or the Internet facsimile 7 on the Internet I and the complex apparatus 1 through the communication network N and the Internet I.

As described above in detail, in the configuration of the complex apparatus 1 and the security box 3 of Embodiment 3, when a security box (additional processing apparatus) 3 is connected to the complex apparatus (image processing apparatus) 1 not provided with the function of image data protection, the security box 3 can perform the process of protecting the image data, in addition to the processes originally performed by the security box 3. In the configuration that the complex apparatus 1 can perform the process of protecting the image data when the security box 3 is connected, the use of the image processing system of Embodiment 3 protects the image data from the unauthorized use of information. Further, the original image processing apparatus 1 is not provided with the function of image data protection. This reduces the cost. Further, even when the necessity of treating confidential information arises owing to a change in the operating condition of the complex apparatus 1, the image data is protected from the unauthorized use of information in the already introduced complex apparatus 1.

Further, in Embodiment 3, the security box 3 protects the image data transmitted and received between the complex apparatus 1 and the outside, by means of encryption or the like. Thus, even when confidential information is treated in a low-cost complex apparatus 1, the image data is protected from the unauthorized use of information, such as the unauthorized retrieval of the image data from the complex apparatus 1 or the communication network N. Further, the security box 3 allows the hold processing of the image data transmitted to the complex apparatus 1, and hence prevents the unauthorized use of recorded matter of the image so as to protect the image data.

(Embodiment 4)

A part of the storage area of the management section 34 in the security box (data processing apparatus) 3 is used as a management table for storing: an identification number for identifying itself; an identification number for identifying a connection destination apparatus; a password for an administrator; and the e-mail address of a notification destination. FIG. 9 is a conceptual diagram showing an example of the management table. In the management table of FIG. 9, "SB-ΔΔΔΔ", "AR-xxxx", "1234", and "○○@ΔΔ.ne.jp" are registered as the own identification number, the identification number of the connection destination apparatus, the password for the administrator, and the e-mail address of the notification destination, respectively. The own identification number may be the serial number, the manufacturer name, the model name, the user information, the installation location information, or the like, and is inputted in advance at the manufacturing or the installation of the apparatus. The identification number of the apparatus at an installation location is, similarly to the identification number of the security box 3, the serial number, the manufacturer name, the model name, the user information, the installation location information, or the like. When the apparatus is connected to the complex apparatus (image processing apparatus) 1 for the first time, the identification number is set up through the operation section 33 or the like. The password for the administrator and the e-mail address of the notification destination are registered by the administrator or a serviceperson through the operation section 33 or using the computer 5 connected via the communication interface 38. Such information registered in the management table is preferably maintained in an encrypted form, and is decrypted when necessary.

In the configuration of Embodiment 4, in order that the security should be ensured for the data stored in the security box 3, proper information (identification information) is periodically exchanged with each other, so that the connection status is detected. When the connection is dissolved, or alternatively when an inappropriate complex apparatus 1 is connected, the security box 3 shuts down the communication with the outside, and thereby suspends the read out of the data stored in the data storage section 36.

Figure 10:
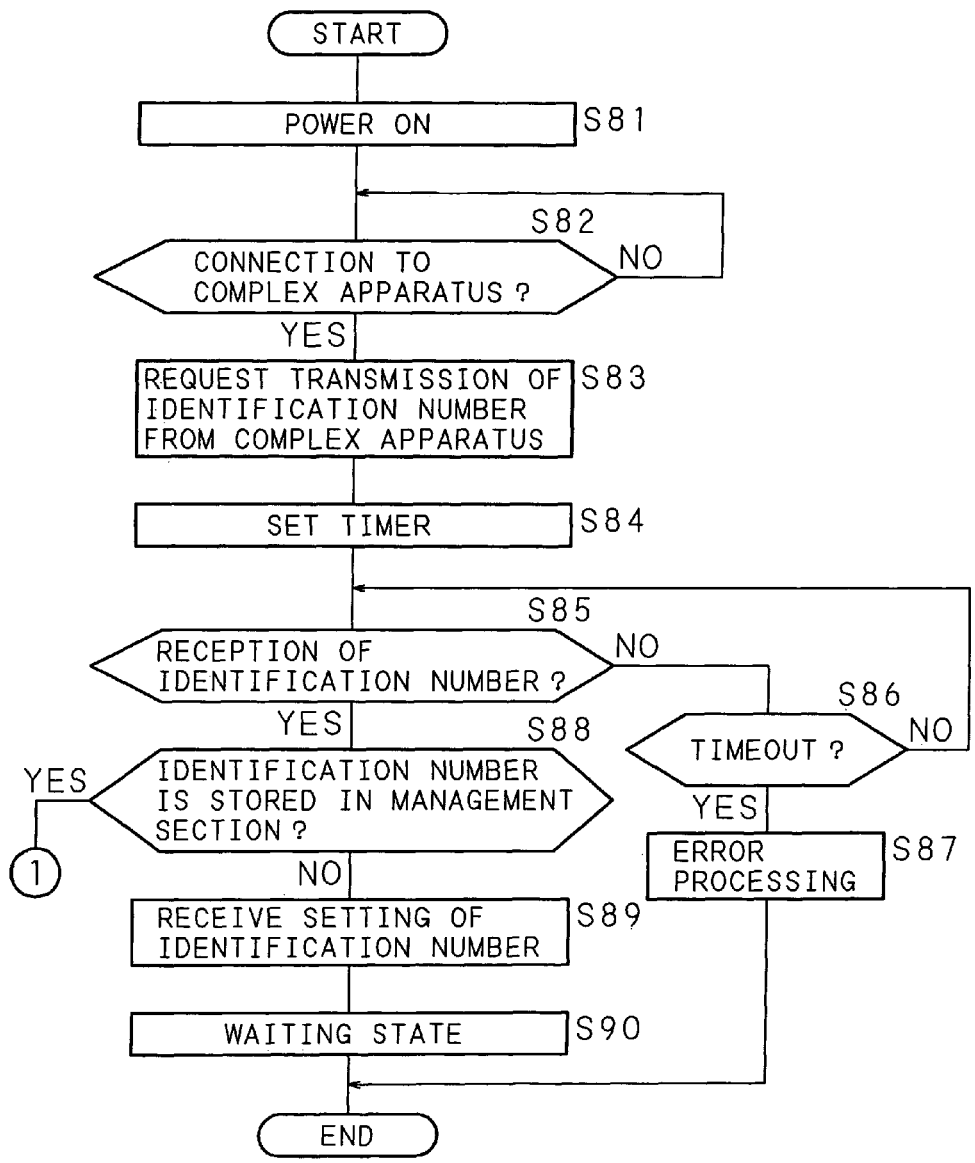
FIG. 10 is a flow chart showing a procedure performed in a security box (data processing apparatus) of Embodiment 4.
Figure 11:
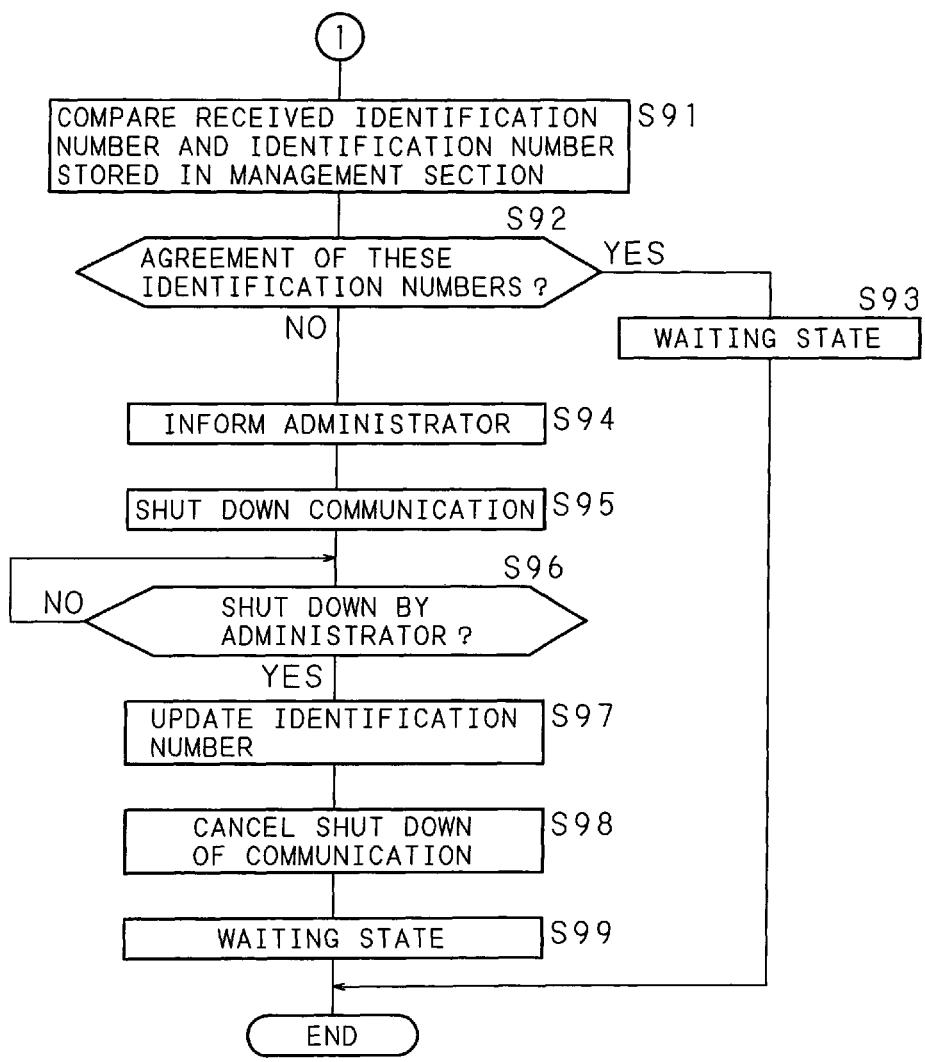
FIG. 11 is a flow chart showing a procedure performed in a security box (data processing apparatus) of Embodiment 4.

The operation of the security box 3 is described below. FIGS. 10 and 11 are flow charts describing the procedure of a process performed by the security box 3 when connected to the complex apparatus 1. When the security box 3 is powered ON (S81), the control section 30 monitors the USB interface 37, and thereby determines whether the connection to the complex apparatus 1 is detected (S82). When the connection to the complex apparatus 1 is not detected (S82: NO), the control section 30 waits until the connection to the complex apparatus 1 is detected.

When the connection to the complex apparatus 1 is detected (S82: YES), the control section 30 requests the transmission of the identification number from the complex apparatus 1 (S83). Then, the control section 30 sets the timer 40 (S84), and thereby determines whether the identification number from the complex apparatus 1 has been received (S85). When no identification number has been received from the complex apparatus 1 (S85: NO), with reference to the output of the timer 40, the control section 30 determines whether timeout has been reached (S86). When timeout is not reached (S86: NO), the procedure returns to S85. When timeout has been reached without the reception of an identification number (S86: YES), error processing is performed (S87), and then the procedure of this flow chart is completed.

When an identification number is received (S85: YES), it is determined whether the identification number of any connection destination is already stored in the management table in the management section 34 (S88). When no identification number of any connection destination is stored already (S88: NO), that is, when the security box 3 is connected to the complex apparatus 1 for the first time, the setting of an identification number need be received (S89). The setting of the identification number is received in response to the operation of the administrator through the operation section 33 or through the operation panel 13 of the complex apparatus 1. The received identification number is registered into the management table. Then, the procedure goes into a waiting state for awaiting data through the USB interface 37 and the communication interface 38 (S90).

When the identification number of any connection destination is already stored in the management table in the management section 34 (S88: YES), the received identification number is compared with the identification number stored in the management table in the management section 34 (S91), so that it is determined whether these identification numbers agree with each other (S92). When these identification numbers agree (S92: YES), the procedure goes into a waiting state for awaiting data through the USB interface 37 and the communication interface 38 (S93).

When the received identification number does not agree with the identification number stored in the management table (S92: NO), a user in the vicinity is warned through the notifying section 39. Further, an e-mail to the administrator is generated and transmitted through the communication interface 38 so that the administrator is informed (S94).

Then, the control section 30 shuts down the communication through the USB interface 37 and the communication interface 38 (S95), and thereby suspends the read out of the data stored in the data storage section 36. Then, the control section 30 determines whether the shut down of the communication has been canceled by an operation of the administrator (S96). When not yet canceled (S96: NO), the cancellation is awaited. When the shut down of the communication is canceled in response to an operation using the operation section 33 or the like (S96: YES), the received identification number is registered into the management table so that the identification number is updated (S97). Then, the shut down of the communication through the USB interface 37 and the communication interface 38 is canceled (S98). Then, the procedure goes into a waiting state for awaiting the reception of the data (S99).

Figure 12:
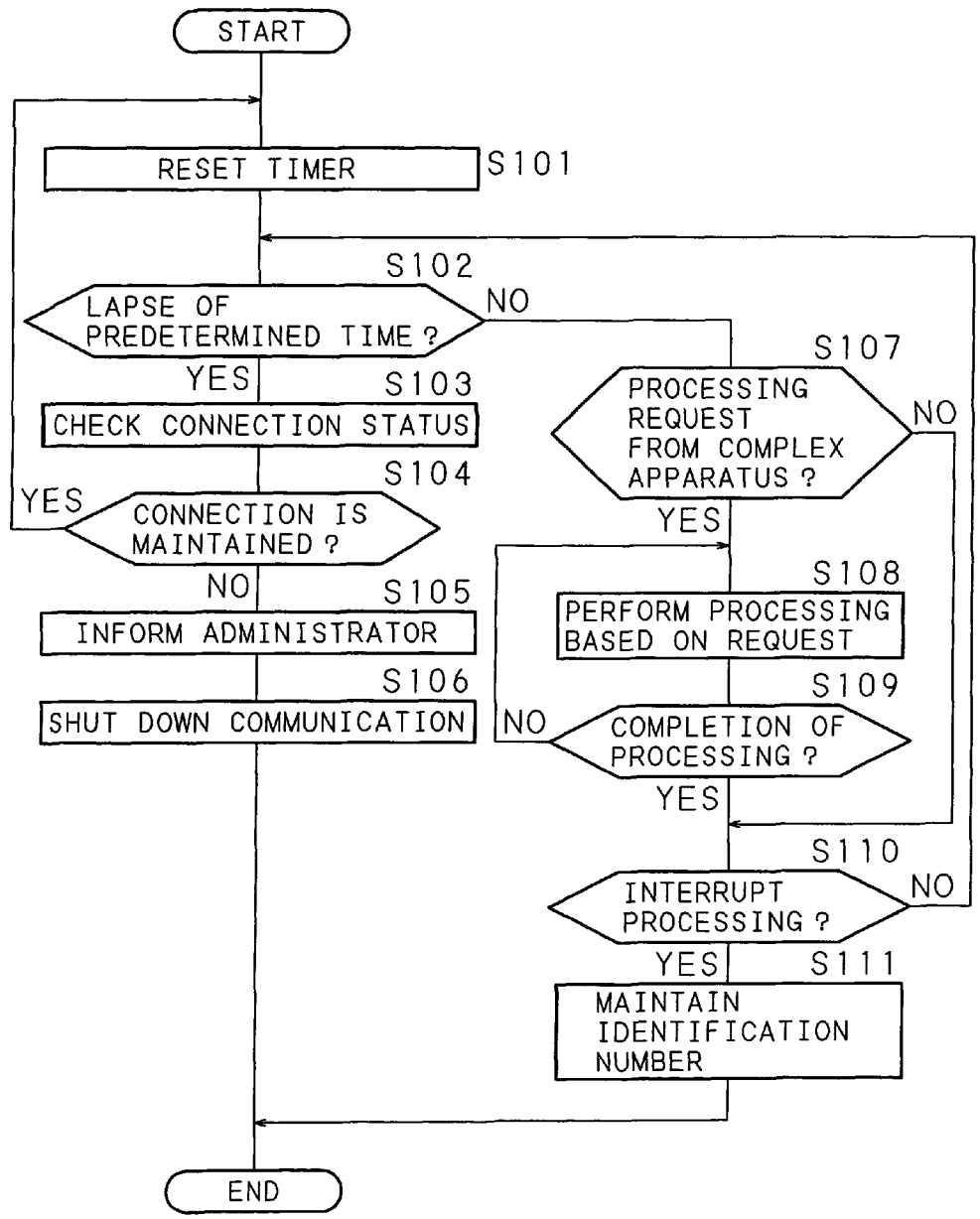
FIG. 12 is a flow chart showing a procedure performed in a security box (data processing apparatus) of Embodiment 4.

FIG. 12 is a flow chart describing the operation of the security box 3 in a waiting state. The control section 30 first resets the timer 40 (S101), and then determines whether a predetermined time has elapsed (S102). When the predetermined time has elapsed (S102: YES), the control section 30 checks the USB interface 37, and thereby checks the status of connection to the complex apparatus 1 (S103). Then, it is determined whether the connection is maintained (S104). When the connection is maintained (S104: YES), the procedure returns to S101.

When the connection is not maintained (S104: NO), a user in the vicinity is warned through the notifying section 39. Further, an e-mail to the administrator is generated and transmitted through the communication interface 38, so that the administrator is informed (S105). Then, the control section 30 shuts down the communication through the USB interface 37 and the communication interface 38 (S106), and thereby restricts the read out of the data stored in the data storage section 36. After the shut down of the communication, a canceling operation from the administrator is requested similarly to the above-mentioned case. When a canceling operation is received, the complex apparatus 1 is re-connected to the security box 3 according to a procedure similar to the flow chart of FIG. 10.

When the predetermined time has not yet elapsed (S102: NO), it is determined whether any processing request has been inputted from the complex apparatus 1 (S107). When a processing request has been inputted (S107: YES), the processing is performed on the basis of the request (S108). Then, the control section 30 determines whether the processing has been completed (S109). When the processing is not completed (S109: NO), the procedure returns to S108.

When the processing is completed (S109: YES), or alternatively when no processing request remains in the complex apparatus 1 (S107: NO), it is determined whether interrupt processing is necessary in association with the operation of powering OFF or the like (S10). When no interrupt processing is necessary (S110: NO), the procedure returns to S102.

When interrupt processing is necessary (S110: YES), the procedure of this routine is completed in a state that the identification number registered in the management table in the management section 34 is maintained (S111).

As such, in Embodiment 4, when the combination of the complex apparatus 1 and the security box 3 is inappropriate, the operation of the security box 3 is suspended. This prevents secrets leakage by means of replacement, falsification, or the like of the apparatus. Further, the use of a duplicated security box 3 is prevented.

Further, the communication through the USB interface 37 and the communication interface 38 of the security box 3 has been suspended, so that the read out has been suspended for the data stored in the data storage section 36. However, the communication through these interfaces may be maintained intact, while the data storage section 36 may be controlled such that the data read out should be suspended.

(Embodiment 5)

A part of the storage area of the management section 18 in the complex apparatus (image processing apparatus) 1 is used as a management table for storing: an identification number for identifying itself; an identification number for identifying a connection destination apparatus; a password for the administrator; the e-mail address of a notification destination; and information concerning the turning ON and OFF of the process. FIG. 13 is a conceptual diagram showing an example of the management table. In the management table of FIG. 13, "AR-xxxx", "SB-ΔΔΔΔ", "1234", and "∘∘@ΔΔ.ne.jp" are registered as the own identification number, the identification number of the connection destination apparatus, the password for the administrator, and the e-mail address of the notification destination, respectively. Further, in the management table, flags are registered that indicate the permission or inhibition of execution of a secrets process and a transmitting process. Thus, depending on the connection status of the complex apparatus 1 and the security box (data processing apparatus) 3, these processes can be made enabled or disabled. In the example of FIG. 13, both flags are ON. Thus, the functions of the secrets process and the transmitting process are permitted.

The own identification number registered into this management table may be the serial number, the manufacturer name, the model name, the user information, the installation location information, or the like, and is proper information inputted in advance at manufacturing or installation of the apparatus. Further, the identification number of the connection destination apparatus is, similarly to the identification number of the complex apparatus 1, the serial number, the manufacturer name, the model name, the user information, the installation location information, or the like. When the security box 3 is connected for the first time, the administrator or the like sets up the identification number. Further, the password for the administrator and the e-mail address of the notification destination are registered by the administrator or the like using the operation panel 13. Such information registered in the management table is preferably maintained in an encrypted form, and is decrypted when necessary.

In the configuration of Embodiment 5, in order that the security should be ensured for the data stored in the security box 3, proper information is periodically exchanged with each other, so that the connection status is detected. When the connection is dissolved, or alternatively when an inappropriate security box 3 is connected, the complex apparatus 1 shuts down the communication to the security box 3, and thereby suspend the read out of the data stored in the data storage section 36.

Figure 14:
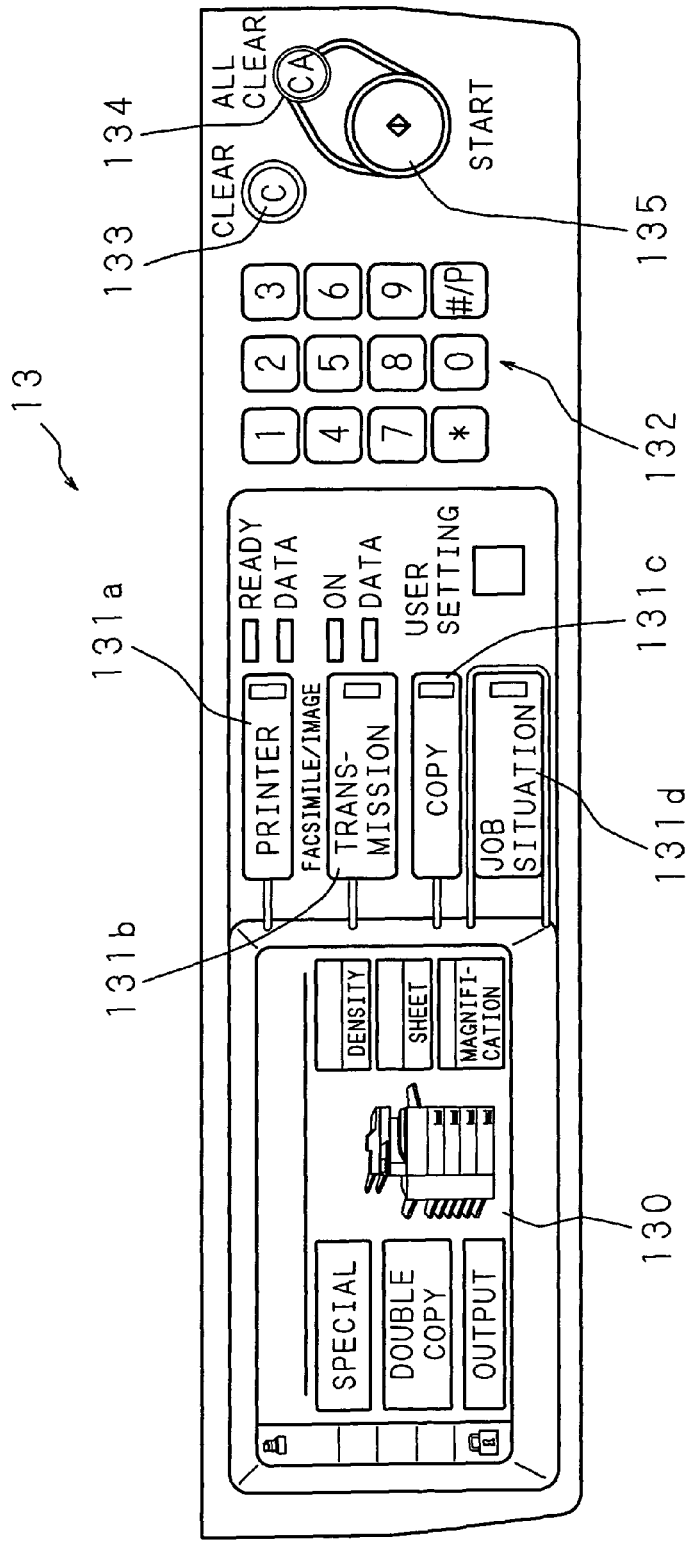
FIG. 14 is a schematic diagram showing an example of an operation panel.

In Embodiment 5, when the security box 3 is connected, the complex apparatus 1 enables the hold print function and the image transmitting function such that these functions may be used through the operation panel 13. FIG. 14 is a schematic diagram showing an example of the operation panel 13. The operation panel 13 comprises: an operation section provided with various hardware keys; and a displaying section 130 provided with an LCD unit employing a touch panel. The hardware keys provided in the operation section comprises: function change keys 131a-131d for changing the function among a print function, an image transmitting function, a copy function, and a job situation displaying function; a numeric keypad 132 for numerical input; a clear key 133 for clearing various inputted setting values; an all clear key 134 for clearing all the inputted setting values; and a start key 135 for instructing the copy start or the like. A part of the displaying section 130 constitutes software keys of touch panel method. Thus, various kinds of setting values inputted through the operation section and information to be notified to the user are displayed, while the selection operation for the various contents of the setting can be received through the software keys.

FIGS. 15A-15C, 16A and 16B are schematic diagrams showing an example of a screen displayed on the displaying section 130 of the operation panel 13. When the functional change key 131d is pressed for displaying the job situation, a screen as, shown in FIG. 15A is displayed on the displaying section 130, so that the situation is displayed for already completed jobs and currently held jobs. In the example of the screen of FIG. 15A, the job having a job name "P001" and a job having a job name "P002" have been completed. The job having a job name "P003" is held in the security box 3. In the display screen of FIG. 15A, a software key is provided in correspondence to each job. When a corresponding software key is pressed, the held job is outputted.

The hold print function is disabled in a state that the security box 3 is not connected. Thus, even when the software key corresponding to the job having the job name "P003" is pressed, a warning message as shown in FIG. 15B is displayed, so that the user is informed of the situation that the output of the data is inhibited. In contrast, in a state that the security box 3 is connected, the hold print function is enabled. Thus, the user is prompted to input authentication information (such as a PIN code) such that the data should be outputted (see FIG. 15C).

Figure 16A:
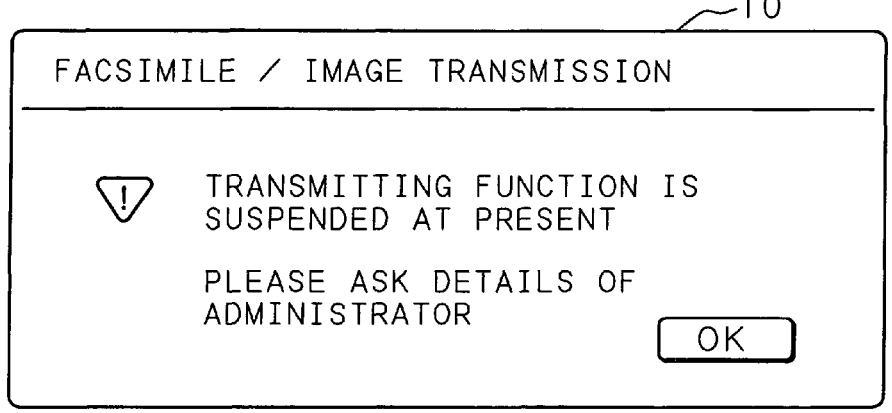
FIGS. 16A and 16B are schematic diagrams showing an example of a screen displayed on a displaying section of an operation panel of Embodiment 5.
Figure 16B:
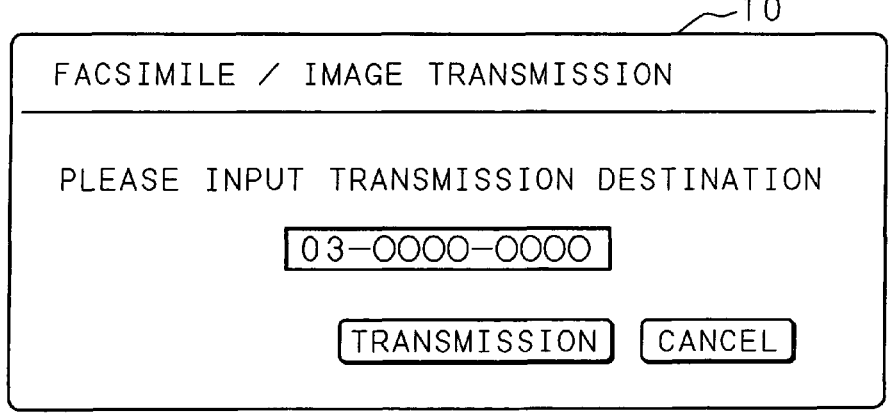

Further, in a state that the security box 3 is not connected, the image transmitting function is disabled. Thus, even when the function change key 131b is pressed, a warning message as shown in FIG. 16A is displayed, so that the user is informed of the situation that the transmitting function is suspended. In contrast, in a state that the security box 3 is connected, the image transmitting function is enabled. Thus, a screen (see FIG. 16B) for prompting the user to input the number for the transmission destination such as the facsimile number, the e-mail address, the network address, or the like. As such, an image data transmission request is received.

Figure 17:
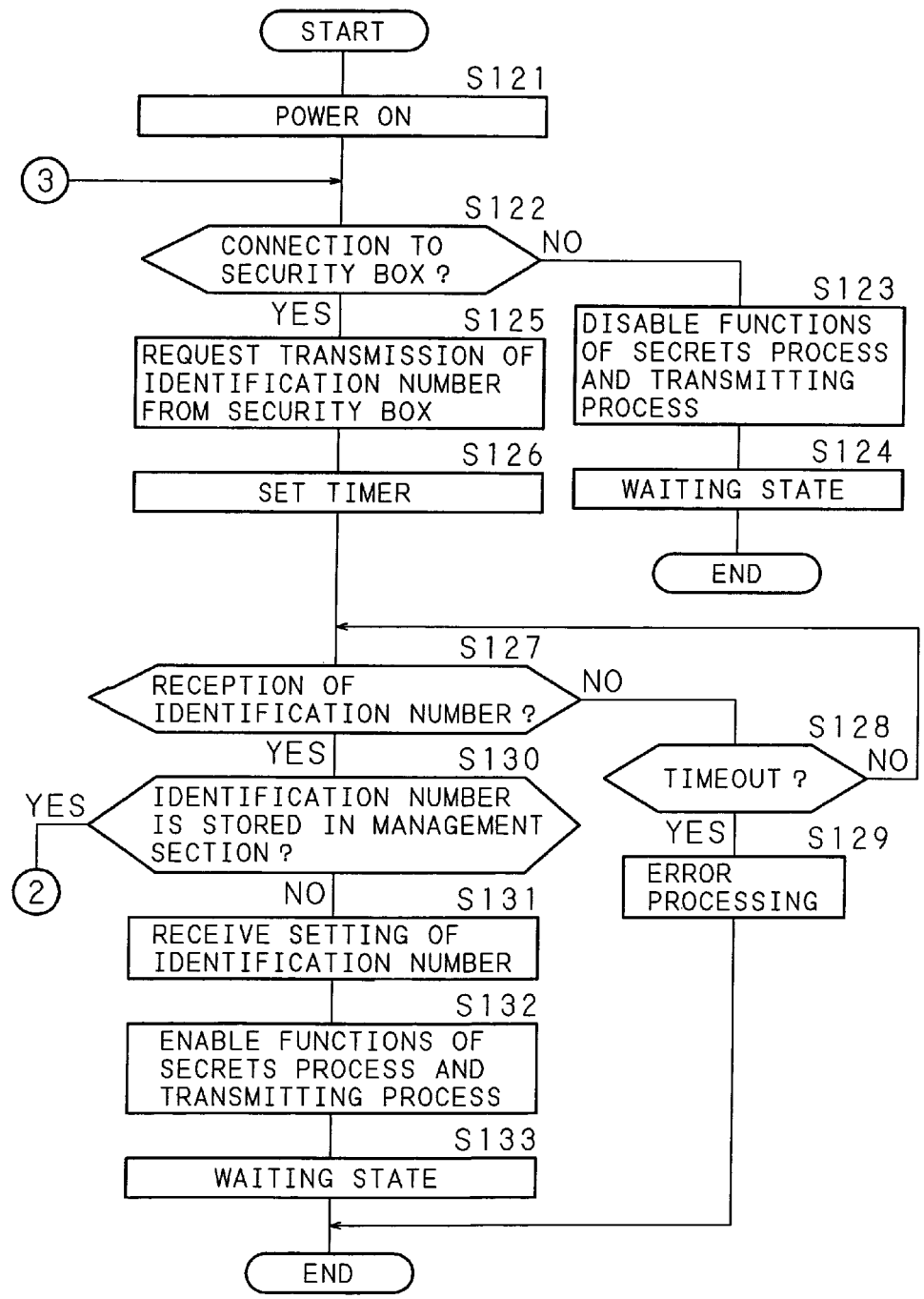
FIG. 17 is a flow chart showing a procedure performed in a complex apparatus (image processing apparatus) of Embodiment 5.
Figure 18:
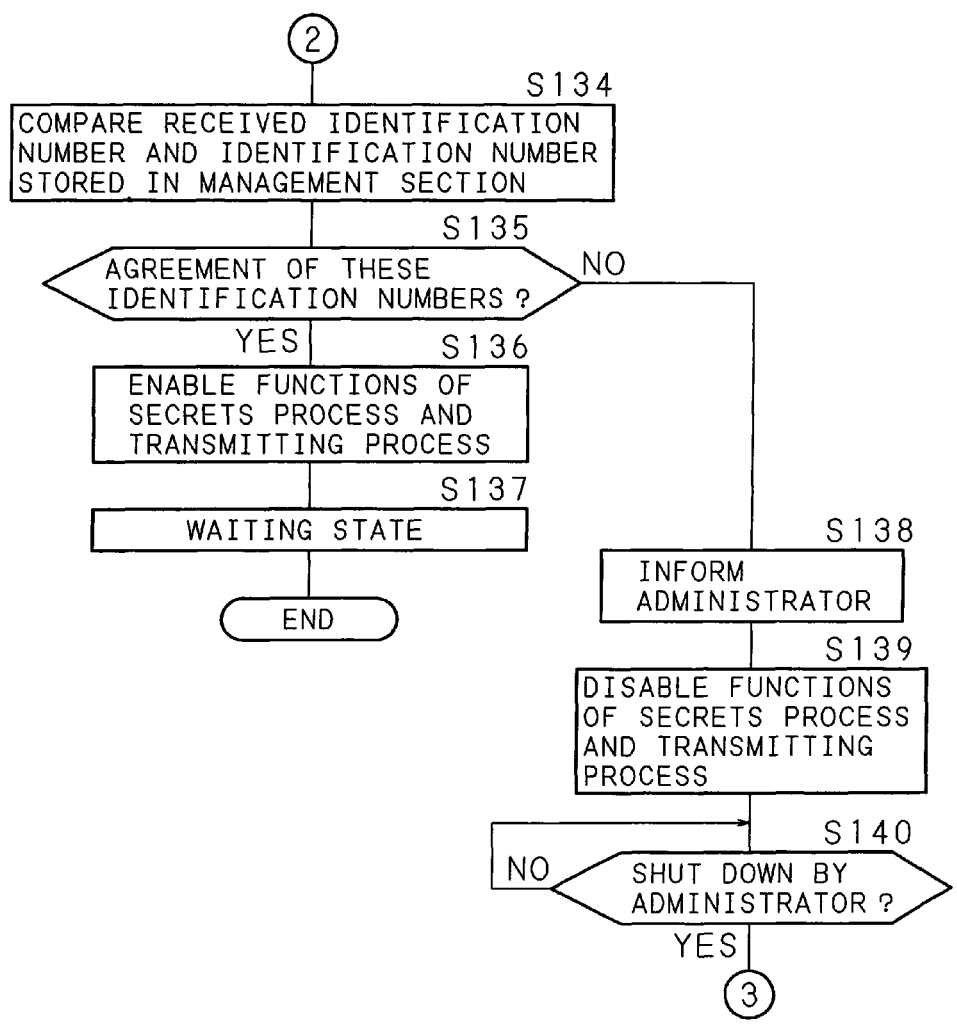
FIG. 18 is a flow chart showing a procedure performed in a complex apparatus (image processing apparatus) of Embodiment 5.

The operation of the complex apparatus 1 is described below. FIGS. 17 and 18 are flow charts showing the procedure of a process performed by the complex apparatus 1 at power activation. When the complex apparatus 1 is powered ON (S121), the control section 10 monitors the USB interface 17, and thereby determines whether the connection to the security box 3 is detected (S122). When the connection to the security box 3 is not detected (S122: NO), the flags in the management table are set up, so that the functions of the secrets process and the transmitting process are disabled (S123). Then, the procedure goes into a waiting state for awaiting the input of a job from the outside (S124).

When the connection to the security box 3 is detected (S122: YES), the transmission of the identification number is requested to the security box 3 (S125). Then, the control section 10 sets the timer 20 (S126), and then determines whether the identification number from the security box 3 has been received (S127). When no identification number has been received from the security box 3 (S127: NO), with reference to the output of the timer 20, it is determined whether timeout has been reached (S128). When timeout is not reached (S128: NO), the procedure returns to S127. When timeout has been reached without the reception of an identification number (S128: YES), error processing is performed (S129), and then the procedure of this flow chart is completed.

When an identification number is received (S127: YES), it is determined whether the identification number of any connection destination is already stored in the management table in the management section 18 (S130). When no identification number of any connection destination is stored already (S130: NO), that is, when the security box 3 is connected to the complex apparatus 1 for the first time, the setting of an identification number need be received (S131). The identification number is inputted by the operation of the administrator through the operation panel 13 of the complex apparatus 1. The received identification number is registered into the management table in the management section 18. Then, the functions of the secrets process and the transmitting process are enabled (S132). Then, the procedure goes into a waiting state for awaiting data through the USB interface 17 (S133).

When the identification number of any connection destination is already stored in the management table in the management section 18 (S130: YES), the received identification number is compared with the identification number stored in the management table in the management section 18 (S134), so that it is determined whether these identification numbers agree with each other (S135). When these identification numbers agree (S135: YES), the functions of the secrets process and the transmitting process are enabled (S136). Then, the procedure goes into a waiting state for awaiting data through the USB interface 17 (S137).

Further, when the received identification number does not agree with the identification number stored in the management table (S135: NO), a warning message is displayed on the operation panel 13. Further, an e-mail to the administrator is generated and transmitted through the USB interface 17, so that the administrator is informed (S138). Then, the functions of the secrets process and the transmitting process are disabled (S139). Then, the complex apparatus 1 requests a canceling operation for restoring the status of connection to the security box 3, and then determines whether cancellation has been achieved by the operation of the administrator (S140). When not canceled (S140: NO), the cancellation is awaited. When canceled (S140: YES), the procedure returns to S122.

Figure 19:
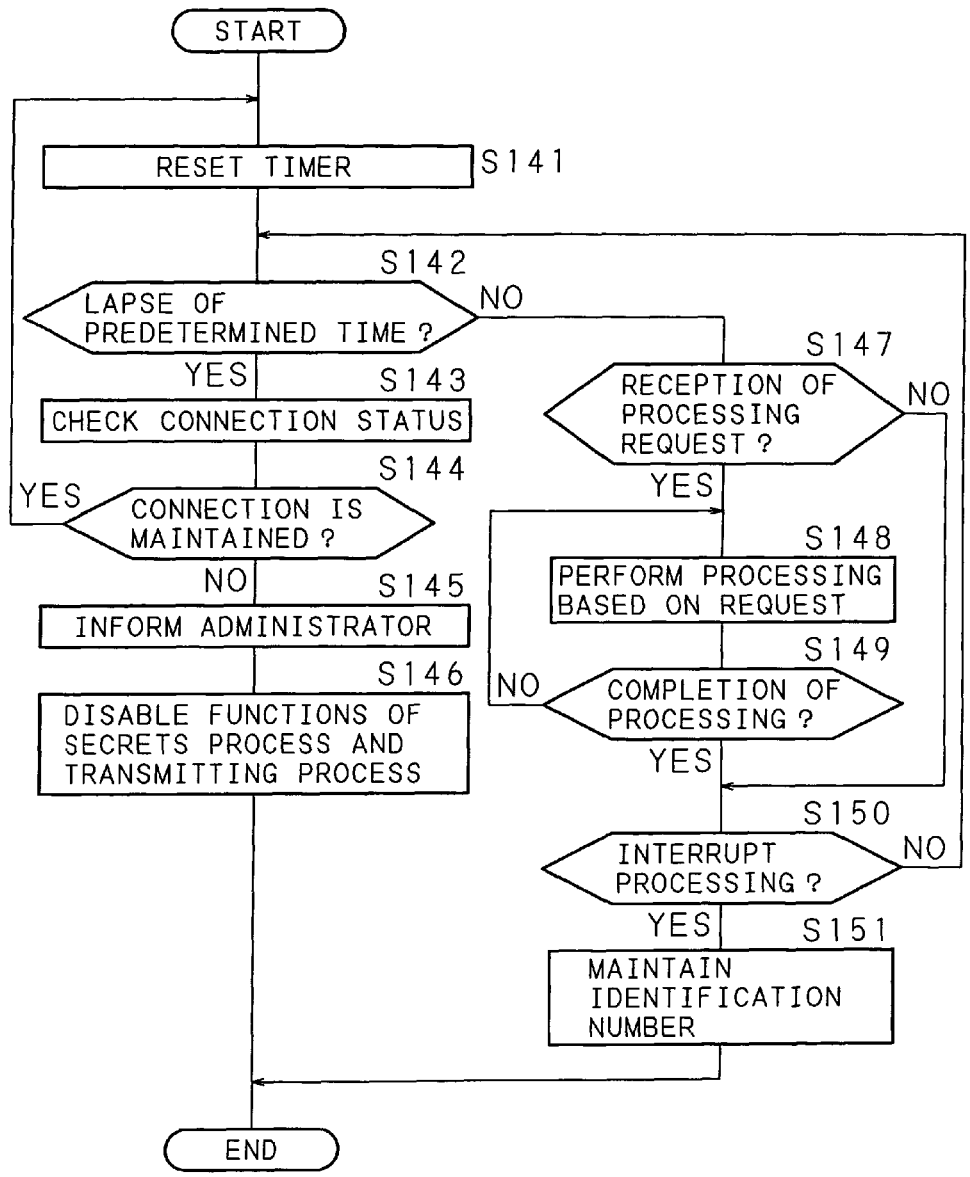
FIG. 19 is a flow chart showing a procedure performed in a complex apparatus (image processing apparatus) of Embodiment 5.

FIG. 19 is a flow chart describing the operation of the complex apparatus 1 in a waiting state. The control section 10 first resets the timer 20 (S141), and then determines whether a predetermined time has elapsed (S142). When the predetermined time has elapsed (S142: YES), the control section 10 checks the USB interface 17, and thereby detects the status of connection to the security box 3 (S143). Then, it is determined whether the connection is maintained (S144). When the connection is maintained (S144: YES), the procedure returns to S141.

When the connection is not maintained (S144: NO), a warning message is displayed on the operation panel 13. Further, an e-mail to the administrator is generated and transmitted through the USB interface 17, so that the administrator is informed (S145). Then, the functions of the secrets process and the transmitting process are disabled (S146). After the functions of the secrets process and the transmitting process are disabled, a canceling operation from the administrator is requested similarly to the above-mentioned case. When a canceling operation is received, the complex apparatus 1 is re-connected to the security box 3 according to a procedure similar to the flow chart of FIG. 17.

When the predetermined time has not yet elapsed (S142: NO), it is determined whether the processing request has been received through the operation panel 13 and the USB interface 17 (S147). When a processing request has been received (S147: YES), the processing is performed on the basis of the request (S148). Then, the control section 10 determines whether the processing has been completed (S149). When the processing is not completed (S149: NO), the procedure returns to S148.

When the processing is completed (S149: YES), or alternatively when no processing request remains in the complex apparatus 1 (S147: NO), it is determined whether interrupt processing is necessary in association with the operation of powering OFF or the like (S150). When no interrupt processing is necessary (S150: NO), the procedure returns to S142. When interrupt processing is necessary (S150: YES), the procedure of this routine is completed in a state that the identification number registered in the management table in the management section 18 is maintained (S151).

As, in Embodiment 5, when the combination of the complex apparatus 1 and the security box 3 is not appropriate, the functions of the secrets process and the transmitting process in the complex apparatus 1 are restricted. This prevents secrets leakage by means of replacement, falsification, or the like of the apparatus. Further, the use of a duplicated security box 3 is prevented.

(Embodiment 6)

When the security box (additional processing apparatus) 3 is connected, the complex apparatus (image processing apparatus) 1 performs authentication in order to determine whether the connection has been performed by an appropriate administrator. In Embodiment 6, the complex apparatus 1 detects whether the security box 3 has been connected via the USB cable 100. Then, when detecting the connection to the security box 3, authentication is performed. When the authentication has been successful, the complex apparatus 1 enables the operation of the security box 3, and permits data transmission and reception to and from the security box 3. When the authentication has been unsuccessful, data transmission and reception are not allowed to and from the security box 3, and the execution is not allowed for the functions imparted only when the security box 3 is connected.

In the image processing system of Embodiment 6, the control section 10 of the complex apparatus 1 serves as a connection detection section for detecting the status of connection to an security box 3 through the USB interface 17, and serves also as an authentication section for performing authentication when the security box 3 is connected to the complex apparatus 1.

Specifically, when the security box 3 is connected via the USB cable 100, the control section 10 displays on the operation panel 13 an input prompt for authentication data, and thereby requests the inputting of the authentication data. The administrator who has connected the security box 3 to the complex apparatus 1 inputs predetermined authentication data through the operation section of the operation panel 13. When the inputted authentication data agrees with the authentication information stored in the management section 18, the control section 10 authorizes the connection of the security box 3, and permits data transmission and reception to and from the security box 3. Thus, for example, when the user of the complex apparatus 1 issues an instruction such that image data read out in the image reading section 14 should be transmitted to a computer 5 connected to the communication interface N, the complex apparatus 1 transmits the read out image data to the computer 5 via the security box 3.

In contrast, when the inputted authentication data does not agree with the authentication information stored in the management section 18, the control section 10 requests re-inputting of the authentication data, and repeats this request for a predetermined number of times until the inputted authentication data agrees with the authentication information stored in the management section 18. Then, when any of the authentication data inputted repeatedly by the predetermined number of times does not agree with the authentication information stored in the management section 18, the control section 10 determines that the appropriate security box 3 is not connected, that is, the authentication has been unsuccessful. Thus, data transmission and reception are inhibited to and from the security box 3. Then, the situation that the authentication has been unsuccessful is displayed on the operation panel 13, so that the administrator is informed. The predetermined number of times for repeating the authentication is set up in advance and stored in the ROM 11. The number of times of unsuccessful authentication for counting the number of times of unsuccessful authentication is stored in the RAM 12 and updated appropriately.

By virtue of this, the administrator who has inputted the authentication data recognizes that the authentication has been unsuccessful, and hence that the functions of the security box 3 cannot be used. Here, even when the data transmission and reception to and from the security box 3 are inhibited, the complex apparatus 1 can perform the processes other than the data transmission and reception to and from the security box 3.

Described below is the operation of the complex apparatus 1 of the image processing system of Embodiment 6 in the case that the security box 3 is connected. FIG. 20 is a flow chart showing the procedure of a process performed by the complex apparatus 1 of Embodiment 6. The following process is performed by the control section 10 according to the control program stored in the ROM 11 in advance.

On the basis of the transmission and reception of signals through the USB cable 100, the control section 10 of the complex apparatus 1 determines whether the security box 3 is connected (S161). When the security box 3 is connected (S161: YES), the number of times of unsuccessful authentication for counting the number of times of unsuccessful authentication in the authenticating process to be performed here is initialized into zero, and then stored into the RAM 12 (S162). Further, the control section 10 displays on the operation panel 13 an input prompt for authentication data, and thereby requests the inputting of the authentication data (S163). When the connection to the security box 3 is not detected (S161: NO), the procedure goes to S170. Then, the control section 10 sets up execution permission solely for the functions originally provided in the complex apparatus 1 (S170).

The control section 10 receives the authentication data inputted by the administrator who has connected the security box 3, according to the prompt on the operation panel 13 (S164), and then determines whether the received authentication data is appropriate, on the basis of whether the received authentication data agrees with the authentication information stored in the management section 18 (S165).

When the authentication data is appropriate (S165: YES), the control section 10 sets up execution permission for data transmission and reception to and from the security box 3 (S166). Thus, for example, when the user instructs the retention of data in the security box 3, the data is permitted to be transmitted to the security box 3.

When the received authentication data is not appropriate (S165: NO), the number of times of unsuccessful authentication is incremented by 1, and then stored into the RAM 12 (S167). The control section 10 determines whether the number of times of unsuccessful authentication stored in the RAM 12 reaches a predetermined value or more (S168). When the predetermined value is not reached (S168: NO), re-inputting of the authentication data is requested (S163). In contrast, when the number of times of unsuccessful authentication reaches a predetermined value or more (S168: YES), the control section 10 displays and notifies on the operation panel 13 that the authentication is unsuccessful and hence that the operation of the security box 3 is inhibited (S169). Then, the control section 10 sets up execution permission solely for the functions originally provided in the complex apparatus 1 (S170).

As such, in Embodiment 6, when the security box 3 is connected to the complex apparatus 1, authentication is performed whether the connection has been performed by an appropriate administrator. When the authentication has been successful, various data processing functions such as the data protection function are imparted in addition to the functions originally provided in the complex apparatus 1. Thus, the capability of processing and the capability of document security protection are improved in the complex apparatus 1. Further, when the authentication has been unsuccessful, the operation of the security box 3 is inhibited. This prevents the leakage, the unauthorized use, or the like of the data.

In Embodiment 6 described above, when the authentication that the connection of the security box 3 had been performed by an appropriate administrator has been unsuccessful, a message indicating that situation has been displayed on the operation panel 13. However, the notifying section (notifying lamp) 19 may be turned ON for the notification. Further, a warning sound may be outputted. Alternatively, a revolving light may be turned ON.

(Embodiment 7)

In the complex apparatus (image processing apparatus) 1 of Embodiment 7, the management section 18 stores a function database concerning the security box (data processing apparatus) 3 as shown in FIG. 21. In this function database, the function code, functional contents, and the authentication necessity or non-necessity are registered in a manner associated with each other for each function that could be provided in the external apparatus connected via the USB cable 100. When the functions used in the external apparatus that may be connected via the USB cable 100 are changed or added, the function database is updated by the control section 10 in response to the administrator's operation of the operation panel 13.

When the security box 3 is connected via the USB cable 100, the complex apparatus 1 requests the transmission of function codes (function information) indicating the functions provided in the connected security box 3. The security box 3 stores in advance in the management section 34 the function codes indicating the functions provided in itself. Thus, in response to the request from the complex apparatus 1, the security box 3 transmits the function codes stored in the management section 34 to the complex apparatus 1. As a result, the complex apparatus 1 acquires the requested function codes. Then, the control section 10 determines whether each function having a function code acquired from the security box 3 is set up as requiring authentication, in the function database. Then, authentication is performed if necessary.

In FIG. 21, "the function of data reception through the communication network" and "the function of data transmission through the communication network" are set up as requiring authentication. Thus, it is determined whether the functions indicated by the function codes acquired from the security box 3 are these functions. As such, authentication is performed when the security box 3 is connected that has a function of performing data transmission or reception to or from the external apparatus via the communication network N. This efficiently prevents the unintentional unauthorized use of the data transmitted or received between the complex apparatus 1 and the security box 3.

When authentication is performed, and when the authentication has been successful that the security box 3 is connected appropriately, the control section 10 enables the operation of the security box 3, and permits data transmission and reception to and from the security box 3. In contrast, when the authentication that the security box 3 is connected appropriately has been unsuccessful, the control section 10 inhibits data transmission and reception to and from the security box 3, and does not permit the execution of the functions imparted only when the security box 3 is connected. Further, comparison of the authentication data inputted by the administrator with the authentication information stored in and the management section 18 is repeated by a predetermined number of times. Then, when any of the authentication data inputted repeatedly by the predetermined number of times does not agree with the authentication information stored in the management section 18, the authentication is unsuccessful. Thus, data transmission and reception is inhibited to and from the security box 3. Further, the situation that the authentication has been unsuccessful is displayed on the operation panel 13, so that the administrator is informed.

Figure 22:
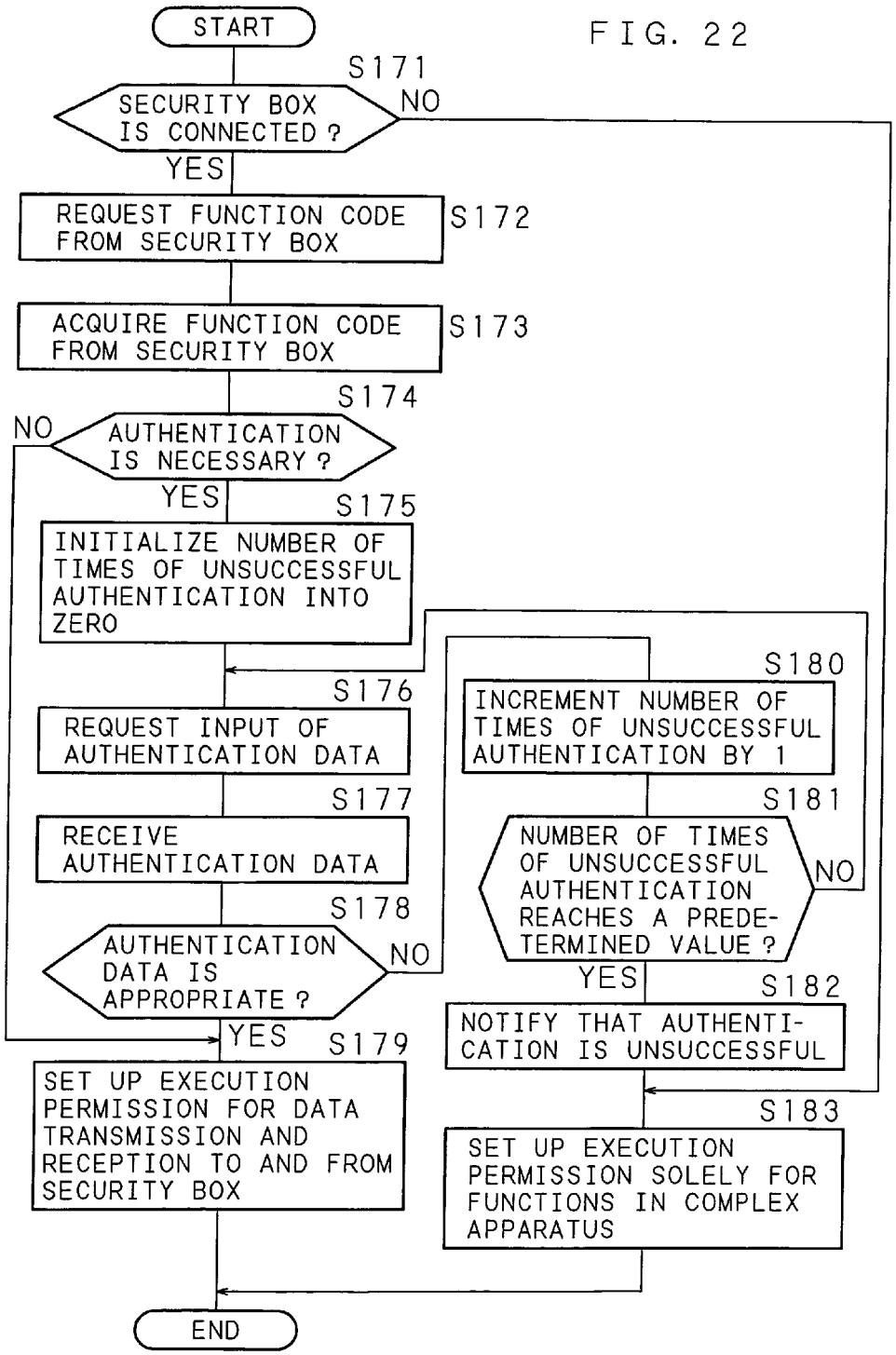
FIG. 22 is a flow chart showing a procedure performed in a complex apparatus (image processing apparatus) of Embodiment 7.

FIG. 22 is a flow chart showing the procedure of a process performed by the complex apparatus 1 of Embodiment 7. The following process is performed by the control section 10 according to the control program stored in the ROM 11 in advance.

On the basis of the transmission and reception of signals through the USB cable 100, the control section 10 of the complex apparatus 1 determines whether the security box 3 is connected (S171). When the security box 3 is not connected (S171: NO), the control section 10 sets up execution permission solely for the functions provided in the complex apparatus 1 (S183). When a security box 3 is connected (S171: YES), the control section 10 requests the transmission of the identification number stored in the management section 34, from the connected security box 3 (S172).

Then, the control section 10 acquires the function code transmitted from the security box 3 in response to the request (S173). Then, on the basis of the contents of registration in the function database stored in the management section 18, the control section 10 determines whether authentication is necessary (S174). When authentication is not necessary (S174: NO), the control section 10 does not perform authentication, and sets up execution permission for data transmission and reception to and from the security box 3 (S179). Thus, for example, when the user instructs the retention of data in the security box 3, the data is permitted to be transmitted to the security box 3.

In contrast, when authentication is necessary (S174: YES), the control section 10 initializes into zero the number of times of unsuccessful authentication, and then stores the value into the RAM 12 (S175). Further, the control section 10 displays on the operation panel 13 an input prompt for authentication data, and thereby requests inputting of the authentication data (S176).

The control section 10 receives the authentication data inputted by the administrator who has connected the security box 3, according to the prompt on the operation panel 13 (S177), and then determines whether the received authentication data is appropriate, on the basis of whether the received authentication data agrees with the authentication information stored in the management section 18 (S178).

When the authentication data is appropriate (S178: YES), the control section 10 sets up execution permission for data transmission and reception to and from the security box 3 (S179). When the received authentication data is not appropriate (S178: NO), the control section 10 increments by 1 the number of times of unsuccessful authentication, and then stores the value into the RAM 12 (S180). The control section 10 determines whether the number of times of unsuccessful authentication stored in the RAM 12 reaches a predetermined value or more (S181). When the predetermined value is not reached (S181: NO), re-inputting of the authentication data is requested (S176). In contrast, when the number of times of unsuccessful authentication reaches the predetermined value or more (S181: YES), the control section 10 displays and notifies on the operation panel 13 that the authentication is unsuccessful and hence that the operation of the security box 3 is inhibited (S182). Then, the control section 10 sets up execution permission solely for the functions originally provided in the complex apparatus 1 (S183).

In Embodiment 7, when the security box 3 is connected to the complex apparatus 1, on the basis of the kinds of functions provided in the connected security box 3, authentication is performed whether the connection has been performed by an appropriate administrator. For example, when the security box 3 provided with the function of data transmission and reception through the communication network N is connected to the complex apparatus 1, authentication is performed. When the authentication has been successful, various data processing functions such as the data protection function are imparted in addition to the functions originally provided in the complex apparatus 1. Thus, the capability of processing and the capability of document security protection are improved in the complex apparatus 1. Further, when the authentication has been unsuccessful, the operation of the security box 3 is inhibited. This prevents the leakage, the unauthorized use, or the like of the data.

Also in the image processing system in Embodiment 7 described here, the modifications described in Embodiment 6 are similarly employable. Further, in Embodiment 7 described above, when the security box 3 is connected to the complex apparatus 1, the complex apparatus 1 has requested the transmission of the function code from the security box 3. However, when the security box 3 is connected to the complex apparatus 1, the security box 3 may notify the complex apparatus 1 that authentication is necessary.

(Embodiment 8)

In the complex apparatus (image processing apparatus) 1 of Embodiment 8, the management section 18 stores a function database concerning the security box (data processing apparatus) 3 as shown in FIG. 23A. In this function database, the function codes indicating the functions provided in each external apparatus, the contents of the functions, and the necessity or non-necessity of authentication are registered in a manner associated with each other for each identification number (identification information) for identifying each external apparatus that may be connected via the USB cable 100. When the types of the external apparatuses that may be connected via the USB cable 100 are changed or added, the function database is updated by the control section 10 in response to the administrator's operation of the operation panel 13.

When the security box 3 is connected via the USB cable 100, the complex apparatus 1 requests the transmission of the identification number (identification information) for identifying the connected security box 3. The security box 3 stores in advance in the management section 34 the identification number (identification information) for identifying itself. Thus, in response to the request from the complex apparatus 1, the security box 3 transmits the identification number to the complex apparatus 1. As a result, the complex apparatus 1 acquires the requested identification number. Then, the control section 10 determines whether each function provided in the apparatus identified by the identification number acquired from the security box 3 is registered as requiring authentication, in the function database. Then, authentication is performed if necessary.

For example, when the complex apparatus 1 acquires the identification number 100 from the security box 3, it is determined whether any function having been set up as requiring authentication is included in the functions provided in the apparatus having the identification number 100. Then, authentication is performed if necessary. Here, as shown in FIG. 23B, a function database may be used in which the authentication necessity or non-necessity is simply listed for each identification number to be acquired from the security box 3. Then, on the basis of the identification number from the security box 3, it may be determined whether authentication is necessary.

When authentication is performed, and when the authentication has been successful that the security box 3 is connected appropriately, the control section 10 enables the operation of the security box 3, and permits data transmission and reception to and from the security box 3. In contrast, when the authentication that the security box 3 is connected appropriately has been unsuccessful, the control section 10 inhibits data transmission and reception to and from the security box 3. Thus, execution is not allowed for the functions imparted only when the security box 3 is connected. Then, comparison of the authentication data inputted by the administrator with the authentication information stored in the management section 18 is repeated by a predetermined number of times. Then, when any of the authentication data inputted repeatedly by the predetermined number of times does not agree with the authentication information stored in the management section 18, the authentication is unsuccessful. Thus, data transmission and reception is inhibited to and from the security box 3. Further, the situation that the authentication has been unsuccessful is displayed on the operation panel 13, so that the administrator is informed.

Figure 24:
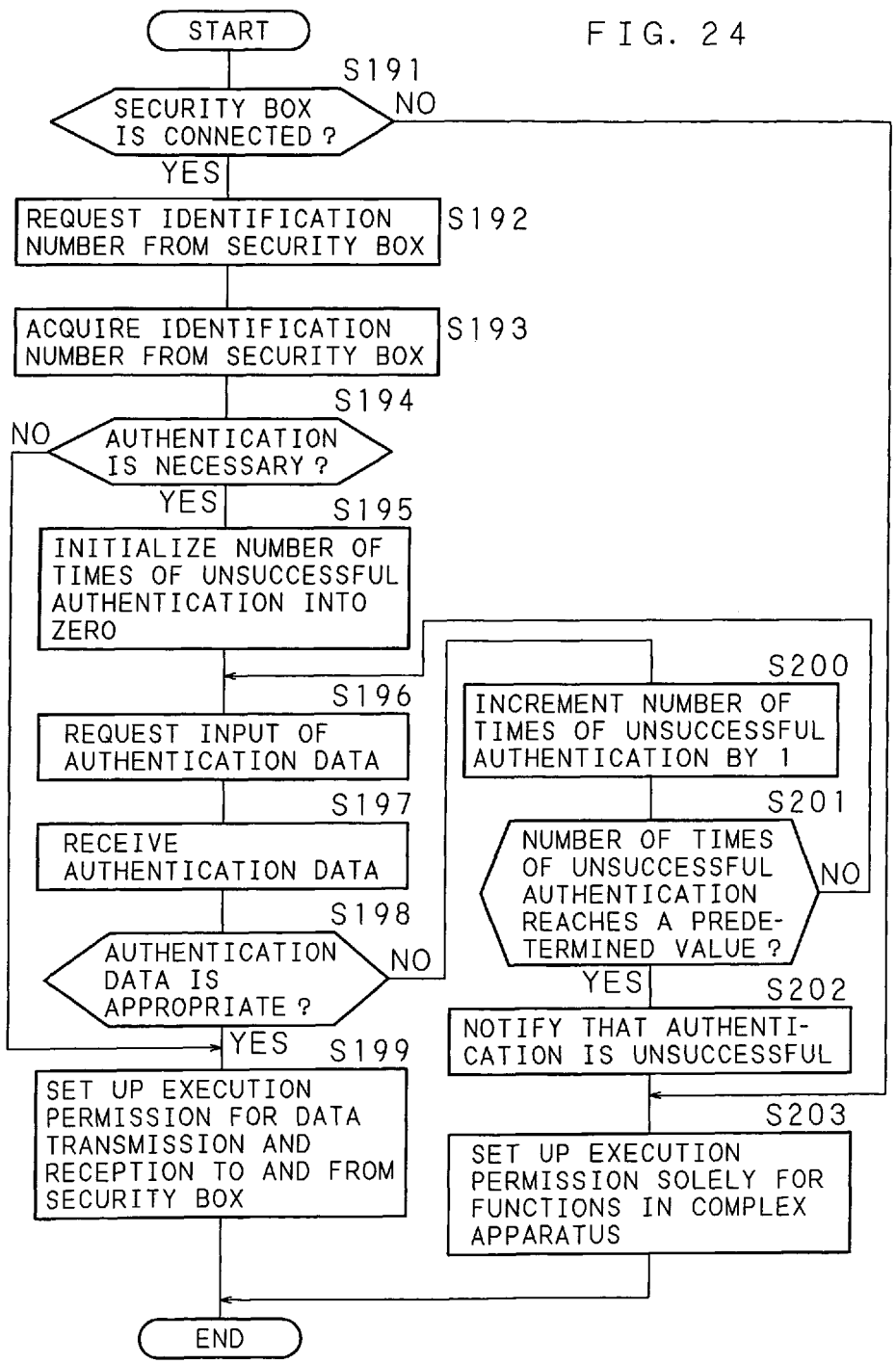
FIG. 24 is a flow chart showing a procedure performed in a complex apparatus (image processing apparatus) of Embodiment 8.

Described below is the operation of the complex apparatus 1 in the case that the security box 3 is connected. FIG. 24 is a flow chart showing the procedure of a process performed by the complex apparatus 1 of Embodiment 8. The following process is performed by the control section 10 according to the control program stored in the ROM 11 in advance.

On the basis of the transmission and reception of signals through the USB cable 100, the control section 10 of the complex apparatus 1 determines whether the security box 3 is connected (S191). When the security box 3 is not connected (S191: NO), the control section 10 sets up execution permission solely for the functions provided in the complex apparatus 1 (S203). When the security box 3 is connected (S191: YES), the control section 10 requests the transmission of the identification number stored in the management section 34, from the connected security box 3 (S192).

Then, the control section 10 acquires the identification number transmitted from the security box 3 in response to the request (S193). Then, on the basis of the contents of registration in the function database stored in the management section 18, the control section 10 determines whether authentication is necessary (S194). When authentication is not necessary (S194: NO), the control section 10 does not perform authentication, and sets up execution permission for data transmission and reception to and from the security box 3 (S199). Thus, for example, when the user instructs the retention of data in the security box 3, the data is permitted to be transmitted to the security box 3.

In contrast, when authentication is necessary (S194: YES), the control section 10 initializes into zero the number of times of unsuccessful authentication, and then stores the value into the RAM 12 (S195). Further, the control section 10 displays on the operation panel 13 an input prompt for the authentication data, and thereby requests inputting of the authentication data (S196). The control section 10 receives the authentication data inputted by the administrator who has connected the security box 3, according to the prompt on the operation panel 13 (S197), and then determines whether the received authentication data is appropriate, on the basis of whether the received authentication data agrees with the authentication information stored in the management section 18 (S198).

When the authentication data is appropriate (S198: YES), the control section 10 sets up execution permission for data transmission and reception to and from the security box 3 (S199). When the received authentication data is not appropriate (S198: NO), the control section 10 increments by 1 the number of times of unsuccessful authentication, and then stores the value into the RAM 12 (S200). The control section 10 determines whether the number of times of unsuccessful authentication stored in the RAM 12 reaches a predetermined value or more (S201). When the predetermined value is not reached (S201: NO), re-inputting of the authentication data is requested (S196). In contrast, when the number of times of unsuccessful authentication reaches the predetermined value or more (S201: YES), the control section 10 displays and notifies on the operation panel 13 that the authentication is unsuccessful and hence that the operation of the security box 3 is inhibited (S202). Then, the control section 10 sets up execution permission solely for the functions originally provided in the complex-apparatus 1 (S203).

As such, in Embodiment 8, when the security box 3 is connected to the complex apparatus 1, the identification number is acquired from the connected security box 3. Then, on the basis of each function provided in the apparatus indicated by the acquired identification number, authentication is performed whether the connection has been performed by an appropriate administrator. Thus, for example, when the apparatus indicated by the identification number acquired from the security box 3 is provided with the function of transmitting or receiving data through the communication network N, authentication is performed. Then, when the authentication has been successful, various data processing functions such as the data protection function are imparted in addition to the functions originally provided in the complex apparatus 1. Thus, the capability of processing and the capability of document security protection are improved in the complex apparatus 1.

When the authentication has been unsuccessful, the operation of the security box 3 is inhibited. This prevents the leakage, the unauthorized use, or the like of the data. Also in the image processing system in Embodiment 8 described here, the modifications described in Embodiments 6 and 7 described above are employable also in the present embodiment.

(Embodiment 9)

In the complex apparatus (image processing apparatus) 1 of Embodiment 9, the management section 18 stores a function database concerning the security box (data processing apparatus) 3 as shown in FIG. 25. In this function database, the function codes indicating the functions provided in each external apparatus, the contents of the functions, the necessity or non-necessity of authentication, and the state of execution permission are registered in a manner associated with each other for each identification number (identification information) for identifying each external apparatus that may be connected via the USB cable 100. When the types of the external apparatuses that may be connected via the USB cable 100 are changed or added, or alternatively when execution is permitted by authorization by the administrator or the like, the function database is updated by the control section 10 in response to the administrator's operation of the operation panel 13.

Similarly to Embodiment 8 described above, when the security box 3 is connected via the USB cable 100, the complex apparatus 1 requests the transmission of the identification number (identification information) for identifying the connected security box 3, and thereby acquires the requested identification number from the security box 3. Then, the control section 10 determines whether each function provided in the apparatus identified by the identification number acquired from the security box 3 is registered as requiring authentication, in the function database. Then, authentication is performed if necessary.

When authentication is performed, and when the authentication has been successful that the security box 3 is connected appropriately, the control section 10 updates into "permission" the execution permission status of the corresponding functions, and then permits the execution of the functions the execution permission status of which has been set into "permission." In contrast, when the authentication that the security box 3 is connected appropriately has been unsuccessful, the control section 10 permits the execution only for functions registered as not requiring authentication in the function database and hence having the execution permission information set up as "permission" in advance. As a result, even when the authentication has been unsuccessful, the complex apparatus 1 can perform the functions not requiring authentication among the functions provided in the security box 3. That is, a part of the functions of the security box 3 are available.

Comparison of the authentication data inputted by the administrator with the authentication information stored in the management section 18 is repeated by a predetermined number of times. Then, when any of the authentication data inputted repeatedly by the predetermined number of times does not agree with the authentication information stored in the management section 18, the authentication is unsuccessful. Thus, data transmission and reception is inhibited to and from the security box 3. Then, the situation that the authentication has been unsuccessful is displayed on the operation panel 13, so that the administrator is informed. Further, when the security box 3 having been connected is removed from the complex apparatus 1, the fields of the execution permission status in the function database are set into the initial state.

Thus, when the functions provided in the apparatus indicated by the identification number acquired by the complex apparatus 1 from the security box 3 do not include a function having been set up as requiring authentication, that is, when the fields of the corresponding execution permission information are all "permission", the complex apparatus 1 does not perform authentication, and sets up execution permission for all the functions of the security box 3.

Figure 26:
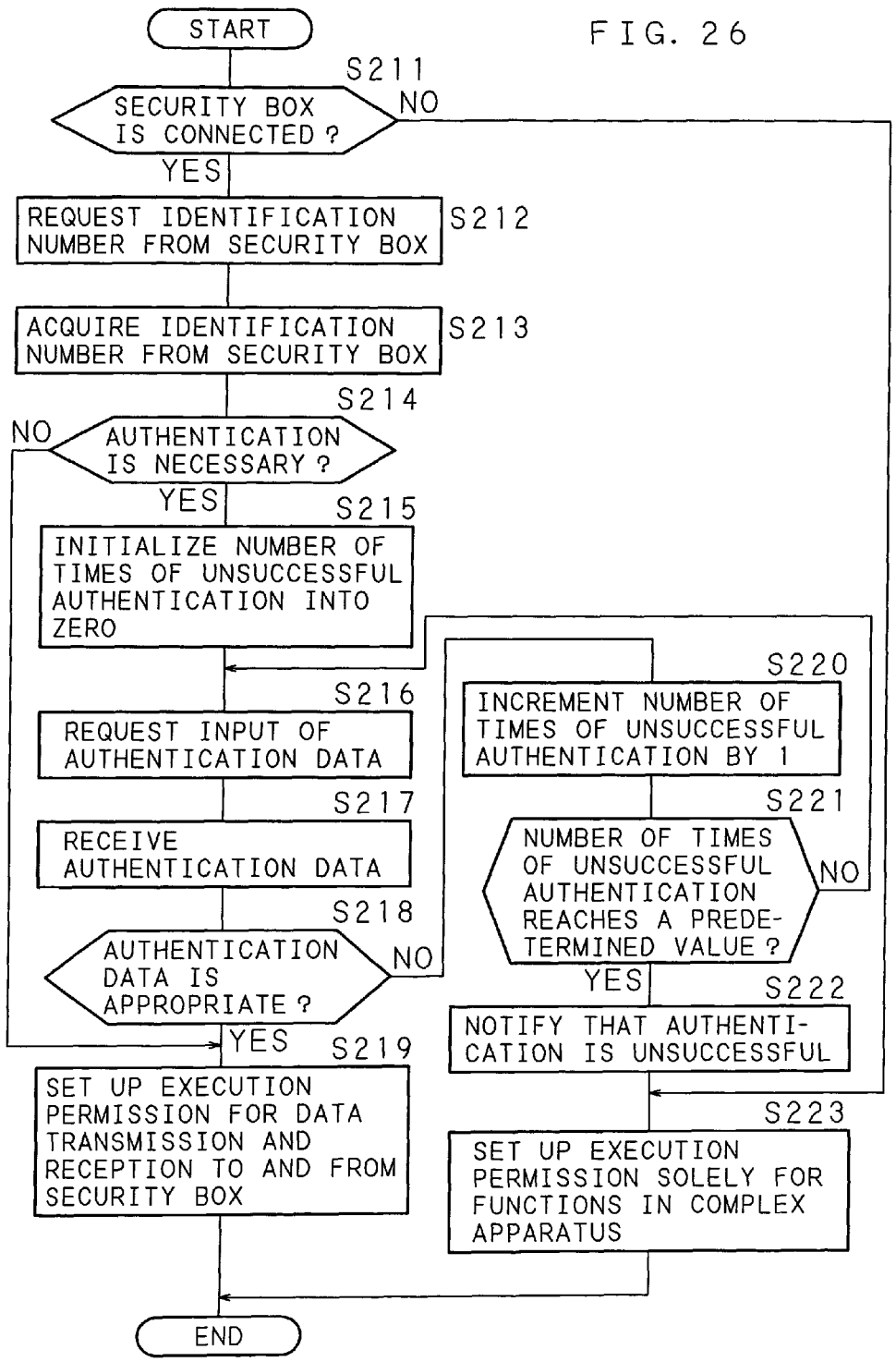
FIG. 26 is a flow chart showing a procedure performed in a complex apparatus (image processing apparatus) of Embodiment 9.

Described below is the operation of the complex apparatus 1 in the case that the security box 3 is connected. FIG. 26 is a flow chart showing the procedure of a process performed by the complex apparatus 1 of Embodiment 9. The following process is performed by the control section 10 according to the control program stored in the ROM 11 in advance.

On the basis of the transmission and reception of signals through the USB cable 100, the control section 10 of the complex apparatus 1 determines whether the security box 3 is connected (S211). When no security box 3 is connected (S211: NO), the control section 10 sets up execution permission solely for the functions provided in the complex apparatus 1 (S223). When the security box 3 is connected (S211: YES), the control section 10 requests the transmission of the identification number stored in the management section 34, from the connected security box 3 (S212).

Then, the control section 10 acquires the identification number transmitted from the security box 3 in response to the request (S213). Then, on the basis of the contents of registration in the function database stored in the management section 18, the control section 10 determines whether authentication is necessary, on the basis of whether the execution permission status of all the functions provided in the apparatus indicated by the acquired identification number is set up as "permission" (S214). When authentication is not necessary (S214: NO), the control section 10 does not perform authentication, and sets up execution permission for all the functions provided in the security box 3 (S219).

In contrast, when authentication is necessary (S214: YES), the control section 10 initializes into zero the number of times of unsuccessful authentication, and then stores the value into the RAM 12 (S215). Further, the control section 10 displays on the operation panel 13 an input prompt for authentication data, and thereby requests inputting of the authentication data (S216). The control section 10 receives the authentication data inputted by the administrator who has connected the security box 3, according to the prompt on the operation panel 13 (S217), and then determines whether the received authentication data is appropriate, on the basis of whether the received authentication data agrees with the authentication information stored in the management section 18 (S218).

When the authentication data is appropriate (S218: YES), the control section 10 sets up execution permission for all the functions provided in the security box 3 (S219). When the received authentication data is not appropriate (S218: NO), the control section 10 increments by 1 the number of times of unsuccessful authentication, and then stores the value into the RAM 12 (S220). The control section 10 determines whether the number of times of unsuccessful authentication stored in the RAM 12 reaches a predetermined value or more (S221). When the predetermined value is not reached (S221: NO), re-inputting of the authentication data is requested (S216).

In contrast, when the number of times of unsuccessful authentication reaches the predetermined value or more (S221: YES), the control section 10 displays and notifies on the operation panel 13 that the authentication is unsuccessful and hence that execution is inhibited for some functions (S222). Then, the control section 10 sets up execution permission solely for the functions not requiring authentication (S223). Specifically, the control section 10 sets up execution permission for all the functions the execution permission status field of which is set up as permission in the function database.

As such, in Embodiment 9, when the security box 3 is connected to the complex apparatus 1, the identification number is acquired from the connected security box 3. Then, authentication is performed when the function provided in the apparatus indicated by the acquired identification number requires authentication. Thus, for example, when the apparatus indicated by the identification number acquired from the security box 3 has the function of transmitting or receiving data through the communication network N, authentication is performed. Then, when the authentication has been successful, this transmitting function requiring authentication is imparted in addition to the functions originally provided in the complex apparatus 1. Further, even when the authentication has been unsuccessful, functions not requiring authentication are imparted in addition to the functions originally provided in the complex apparatus 1.

Also in the image processing system in Embodiment 9 described here, the modifications described in Embodiments 6 and 7 described above are employable also in the present embodiment. The description has been given for the case that when each function corresponding to the identification number acquired from the security box 3 requires authentication, the complex apparatus 1 performs authentication, and that when the authentication has been successful, all the functions requiring authentication are set as execution-permitted. However, in case that a plurality of functions require authentication, authentication information may be different for each function. This configuration improves the security.

In the above-mentioned embodiments, the image processing apparatus has been composed of the complex apparatus 1 provided with a plurality of functions such as those of a printer, a facsimile apparatus, and a scanner. However, the invention is not limited to this. That is, the image processing apparatus may be composed of an apparatus having a single function of a printer, a facsimile apparatus, or a scanner.

Further, the complex apparatus 1 and the security box 3 have been connected through the USB cable 100. However, the invention is not limited to the USB cable 100. That is, for example, the connection may be constructed through a LAN such as an Ethernet (registered trademark) in accordance with IEEE802.3 standard. Alternatively, these two may be used.

Further, the complex apparatus 1 has been connected to the communication network N via the security box 3. However, when the complex apparatus 1 is provided with a communication interface, the complex apparatus 1 may be connected to the communication network through the communication interface. In this case, the security box 3 need not be provided with the communication interface 38. Then, a print job transmitted from a computer 5 is transmitted to the security box 3 via the complex apparatus 1, and then stored in the security box 3.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing system constructed by interconnecting a data processing apparatus to one image processing apparatus, the data processing apparatus encrypting data to be processed by the image processing apparatus, wherein the data processing apparatus includes an identification information storing section for storing identification information for identifying the one image processing apparatus, the image processing system includes:
　a data storage section for storing data inputted from an outside;
　a requesting section for requesting transmission of identification information from a connected image processing apparatus;
　an acquiring section for acquiring the identification information from the connected image processing apparatus;
　a detecting section for detecting, on the basis of comparison of the acquired identification information with the identification information stored in the identification information storing section, whether or not the connected image processing apparatus is the one image processing apparatus;
　a notification section for notifying a detecting result when the detecting section detects that the connected image processing apparatus is not the one image processing apparatus;
　a first restricting section for restricting a process of reading out the data stored in the data storage section and a process of transmitting the data to the connected image processing apparatus when the detecting section detects that, on the basis of the identification information acquired from the connected image processing apparatus, the connected image processing apparatus is not the one image processing apparatus; and
　a user detecting section for detecting a presence of a user in a vicinity, wherein
　when the user detecting section detects the presence of the user, the notification section notifies that the detecting section detects that the connected image processing apparatus is not the one image processing apparatus.

2. The image processing system according to claim 1, comprising:
　a power detecting section for detecting own power activation, wherein
　when the power detecting section detects power activation, the detecting section detects whether or not the connected image processing apparatus is the one image processing apparatus.

3. The image processing system according to claim 1, comprising:
　a time counting section, wherein
　on the basis of a result of time counted by the time counting section, the detecting section periodically detects whether or not the connected image processing apparatus is the one image processing apparatus.

4. The image processing system according to claim 1, comprising:
　a second restricting section for restricting an own execution-permitted process when the detecting section detects that the connected image processing apparatus is not the one image processing apparatus.

5. The image processing system according to claim 4, comprising:
　a canceling section for canceling the restriction on the own execution-permitted process when the detecting section detects that the connected image processing apparatus is the one image processing apparatus.

* * * * *